(12) United States Patent
Kimura et al.

(10) Patent No.: US 9,449,364 B2
(45) Date of Patent: Sep. 20, 2016

(54) INFORMATION PROCESSING APPARATUS, INFORMATION PROCESSING METHOD, AND PROGRAM TO RECOGNIZE CIRCUMSTANCES OF A SUBJECT FROM A MOVING IMAGE

(71) Applicant: SONY CORPORATION, Tokyo (JP)

(72) Inventors: Kentaro Kimura, Tokyo (JP); Yasuyuki Koga, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 50 days.

(21) Appl. No.: 14/507,040

(22) Filed: Oct. 6, 2014

(65) Prior Publication Data
US 2015/0116313 A1  Apr. 30, 2015

(30) Foreign Application Priority Data

Oct. 24, 2013  (JP) ................................. 2013-221124

(51) Int. Cl.
*G06T 19/00* (2011.01)
*G06T 3/00* (2006.01)

(52) U.S. Cl.
CPC ............. *G06T 3/0018* (2013.01); *G06T 19/00* (2013.01)

(58) Field of Classification Search
None
See application file for complete search history.

(56) References Cited

U.S. PATENT DOCUMENTS

| 6,031,541 A * | 2/2000 | Lipscomb ............. G06T 15/205 345/420 |
| 2009/0135178 A1* | 5/2009 | Aihara .................. G06T 15/205 345/419 |

FOREIGN PATENT DOCUMENTS

| JP | H06-124328 A | 5/1994 |
| JP | 2006-033257 A | 2/2006 |
| JP | 2010-034812 A | 2/2010 |
| JP | 2012-134834 A | 7/2012 |

OTHER PUBLICATIONS

Kilgard et al., "The Cg Tutorial: The Definitive Guide to Programmable Real-Time Graphics, Chapter 7—Environment Mapping Techniques," Addison-Wesley Professional, 2003.*

Pintaric et al., "Immersive Panoramic Video," Proceedings of the 8th ACM International Conference on Multimedia, pp. 493-494, Oct. 2000.*

* cited by examiner

*Primary Examiner* — Kee M Tung
*Assistant Examiner* — Nicholas R Wilson
(74) *Attorney, Agent, or Firm* — Chip Law Group

(57) ABSTRACT

There is provided an information processing apparatus including an acquisition unit configured to acquire a moving image generated through imaging by an imaging apparatus having a view angle of 180° or more, and a virtual space generation unit configured to generate a three-dimensional virtual space including one or more objects having a curved inner surface and a curved outer surface, on the basis of a plurality of frame images included in the moving image. The virtual space generation unit generates the three-dimensional virtual space in a manner that, for each of the one or more objects, a frame image included in the plurality of frame images is mapped on at least one of the curved inner surface and the curved outer surface.

20 Claims, 24 Drawing Sheets

33

FIG. 17
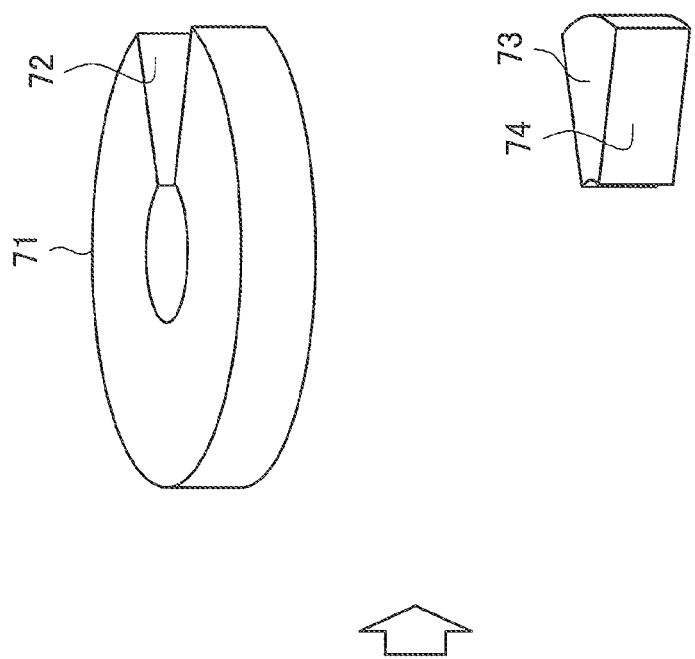
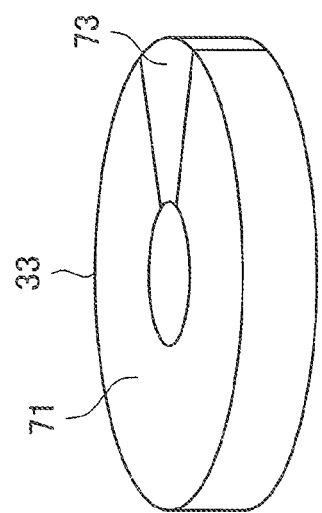

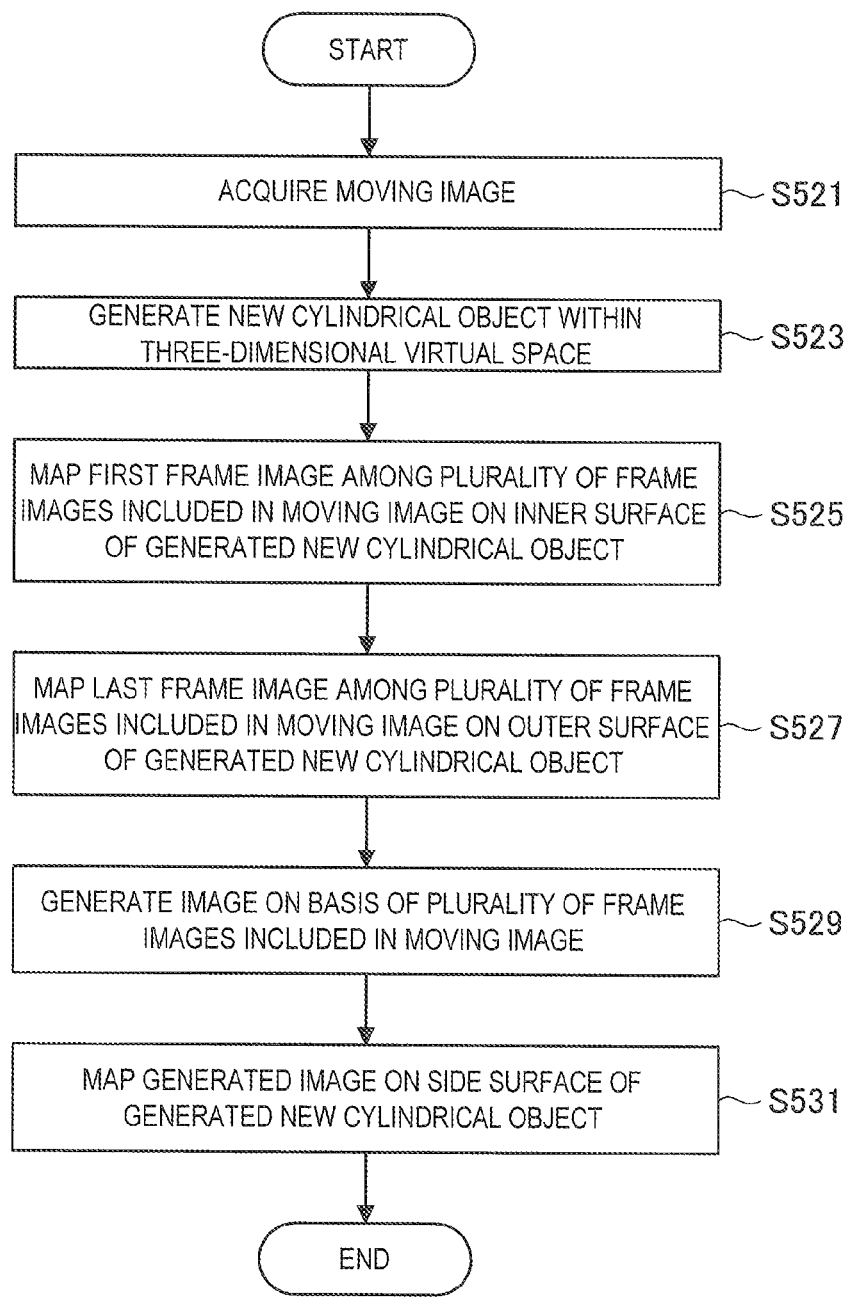

INFORMATION PROCESSING APPARATUS, INFORMATION PROCESSING METHOD, AND PROGRAM TO RECOGNIZE CIRCUMSTANCES OF A SUBJECT FROM A MOVING IMAGE

CROSS REFERENCE TO RELATED APPLICATIONS

This application claims the benefit of Japanese Priority Patent Application JP 2013-221124 filed Oct. 24, 2013, the entire contents of which are incorporated herein by reference.

BACKGROUND

The present disclosure relates to an information processing apparatus, an information processing method, and a program.

Cameras have been commonly used in recent years. For example, many people are using cameras having a view angle of less than 180°. In addition to such common cameras, cameras having a wider view angle are beginning to be used. As an example, a 360° camera and a whole-sky camera are beginning to be used. Accordingly, there are proposed a variety of technologies related to the 360° camera or the whole-sky camera.

For example, JP 2010-034812A discloses a technique that facilitates recognition of the positional relation of people, for example, by combining partial images of a full-perimeter video. Further, JP 2012-134834A discloses a technique that generates an omnidirectional image and also an image of a target region in the omnidirectional image, and facilitates recognition of the omnidirectional image by displaying the omnidirectional image and the image of the target region in the omnidirectional image. Furthermore, JP 2006-033257A discloses a technique that facilitates distribution of an image in a requested imaging direction by distributing a partial image corresponding to the requested imaging direction from a 360° image in accordance with the request for the imaging direction. Furthermore, JP H6-124328A discloses a technique that enables a subject to be viewed from various directions by combining a plurality of images each including a part of a wide-ranging imaging target in accordance with an instruction of a viewpoint direction.

SUMMARY

However, with techniques in the related art including the techniques disclosed in JP 2010-034812A, JP 2012-134834A, JP 2006-033257A, and JP H6-124328A above, for example, it is difficult to intuitively recognize circumstances of a subject from a moving image. For example, with the techniques disclosed in JP 2010-034812A and JP 2012-134834A, in order to recognize circumstances of a subject, it is necessary to compare a plurality of images with each other substantially. Accordingly, it may be difficult to intuitively recognize circumstances of a subject. Further, for example, with the techniques disclosed in JP 2006-033257A and JP H6-124328A, although it is possible to view a subject from the desired direction, it may be difficult to intuitively recognize circumstances of a wide-ranging subject.

Accordingly, it is desirable to provide a system that enables circumstances of a subject to be recognized intuitively from a moving image generated through an imaging apparatus having a wide view angle.

According to an embodiment of the present disclosure, there is provided an information processing apparatus including an acquisition unit configured to acquire a moving image generated through imaging by an imaging apparatus having a view angle of 180° or more, and a virtual space generation unit configured to generate a three-dimensional virtual space including one or more objects having a curved inner surface and a curved outer surface, on the basis of a plurality of frame images included in the moving image. The virtual space generation unit generates the three-dimensional virtual space in a manner that, for each of the one or more objects, a frame image included in the plurality of frame images is mapped on at least one of the curved inner surface and the curved outer surface.

According to another embodiment of the present disclosure, there is provided an information processing method including acquiring a moving image generated through imaging by an imaging apparatus having a view angle of 180° or more, and generating, by a processor, a three-dimensional virtual space including one or more objects having a curved inner surface and a curved outer surface, on the basis of a plurality of frame images included in the moving image. The generating the three-dimensional virtual space includes generating the three-dimensional virtual space in a manner that, for each of the one or more objects, a frame image included in the plurality of frame images is mapped on at least one of the curved inner surface and the curved outer surface.

According to another embodiment of the present disclosure, there is provided a program for causing a computer to execute acquiring a moving image generated through imaging by an imaging apparatus having a view angle of 180° or more, and generating a three-dimensional virtual space including one or more objects having a curved inner surface and a curved outer surface, on the basis of a plurality of frame images included in the moving image. The generating the three-dimensional virtual space includes generating the three-dimensional virtual space in a manner that, for each of the one or more objects, a frame image included in the plurality of frame images is mapped on at least one of the curved inner surface and the curved outer surface.

As described above, according to one or more of embodiments of the present disclosure, it becomes possible to intuitively recognize circumstances of a subject from a moving image generated through an imaging apparatus having a wide view angle. Note that the effects described above are not limiting. That is, the technology according to the present disclosure can exhibit any of the effects described in the specification or other effects that are apparent from the descriptions in the specification, along with the above effects or instead of the above effects.

BRIEF DESCRIPTION OF THE DRAWINGS

FIG. 17 shows an example of generation of a cut object generated by cutting;

FIG. 24 is a flowchart showing an example of a schematic flow of processing for generating a three-dimensional virtual space according to a second modification example of an embodiment.

DETAILED DESCRIPTION OF THE EMBODIMENT(S)

Figure 1:
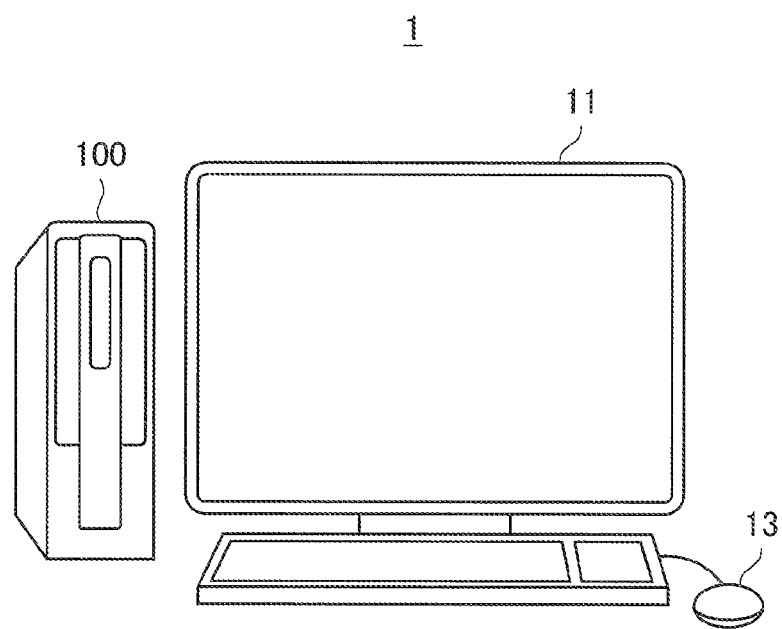
FIG. 1 shows an example of a schematic configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that the description will be made in the following order.

1. Schematic configuration of information processing system
2. Configuration of information processing apparatus
2.1. Functional configuration
2.2. Hardware configuration
3. Generation of three-dimensional virtual space
3.1. Basic generation of three-dimensional virtual space
3.2. Generation of subset in accordance with specified conditions
3.3. Generation of subset in accordance with scene
3.4. Generation of object by cutting
4. Viewing of three-dimensional virtual space
4.1. Viewing from position inside object
4.2. Viewing from given position
5. Modification example
5.1. First modification example
5.2. Second modification example
6. Conclusion

1. Schematic Configuration of Information Processing System

First, a schematic configuration of an information processing system 1 according to an embodiment of the present disclosure will be described with reference to FIG. 1. FIG. 1 shows an example of the schematic configuration of the information processing system 1 according to this embodiment. Referring to FIG. 1, the information processing system 1 includes a display device 11, an input device 13, and an information processing apparatus 100.

The display device 11 displays a screen under control of the information processing apparatus 100. For example, the display device 11 displays a screen including an image. The display device 11 is a display, for example.

The input device 13 provides input information to the information processing apparatus 100 in accordance with an input made by a user of the information processing system 1. The input device 13 is a pointing device, for example. As an example, the input device 13 is a mouse.

The information processing apparatus 100 performs various kinds of information processing. For example, the information processing apparatus 100 performs processing on the basis of the input information provided by the input device 13. Further, for example, the information processing apparatus 100 controls the display performed by the display device 11. Specifically, for example, the information processing apparatus 100 causes the display device 11 to display the screen. The information processing apparatus 100 is a personal computer (PC), for example.

2. Configuration of Information Processing Apparatus

Next, a configuration of the information processing apparatus 100 according to this embodiment will be described with reference to FIG. 2 to FIG. 5.

2.1. Functional Configuration

Figure 2:
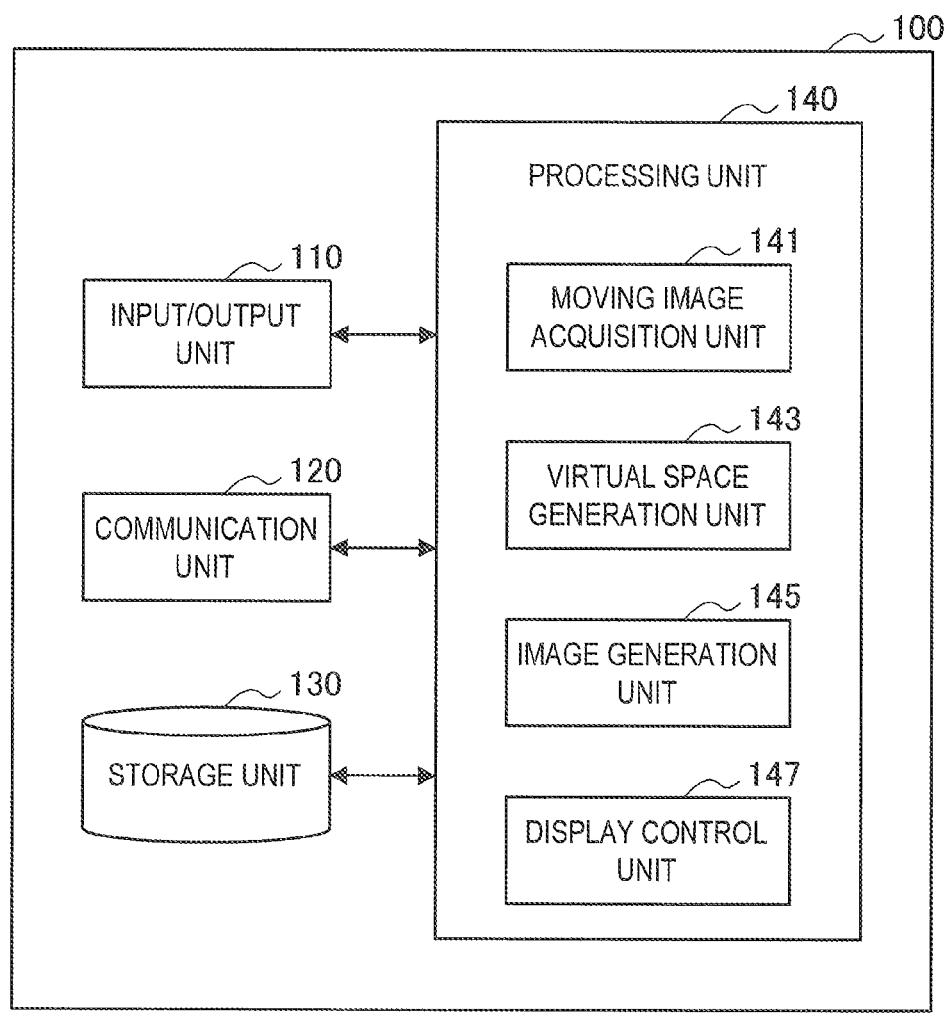
FIG. 2 is a block diagram showing an example of a functional configuration of an information processing apparatus 100 according to an embodiment.

First, a functional configuration of the information processing apparatus 100 according to this embodiment will be described with reference to FIG. 2 to FIG. 4. FIG. 2 is a block diagram showing an example of the functional configuration of the information processing apparatus 100 according to this embodiment. Referring to FIG. 2, the information processing apparatus 100 includes an input/ output unit 110, a communication unit 120, a storage unit 130, and a processing unit 140.

(Input/Output Unit 110)

The input/output unit 110 acquires input information provided by another device. The input/output unit 110 also provides another device with output information that is to be outputted to the other device.

For example, the input/output unit 110 acquires the input information provided by the input device 13. Then, the input/output unit 110 provides the input information to the processing unit 140.

Further, for example, when the processing unit 140 (display control unit 147) provides the input/output unit 110 with output information that is to be outputted to the display device 11, the input/output unit 110 provides the output information to the display device 11. The output information is screen information, for example.

(Communication Unit 120)

The communication unit 120 communicates with another device. For example, the communication unit 120 transmits information to another device. Further, the communication unit 120 receives information from another device. Note that the communication unit 120 may perform wired communication or wireless communication.

(Storage Unit 130)

The storage unit 130 stores a program and data for operation of the information processing apparatus 100 temporarily or permanently. In this embodiment, the storage unit 130 stores a moving image, for example.

(Processing Unit 140)

The processing unit 140 provides various functions of the information processing apparatus 100. The processing unit 140 includes a moving image acquisition unit 141, a virtual space generation unit 143, an image generation unit 145, and the display control unit 147.

(Moving Image Acquisition Unit 141)

The moving image acquisition unit 141 acquires a moving image generated through imaging by an imaging apparatus having a view angle of 180° or more.

For example, the imaging apparatus has a view angle of 180° or more in at least one of the horizontal direction and the vertical direction. As an example, the imaging apparatus has a view angle of 360° in the horizontal direction. A specific example of the acquired moving image will be shown below with reference to FIG. 3 and FIG. 4.

Figure 3:
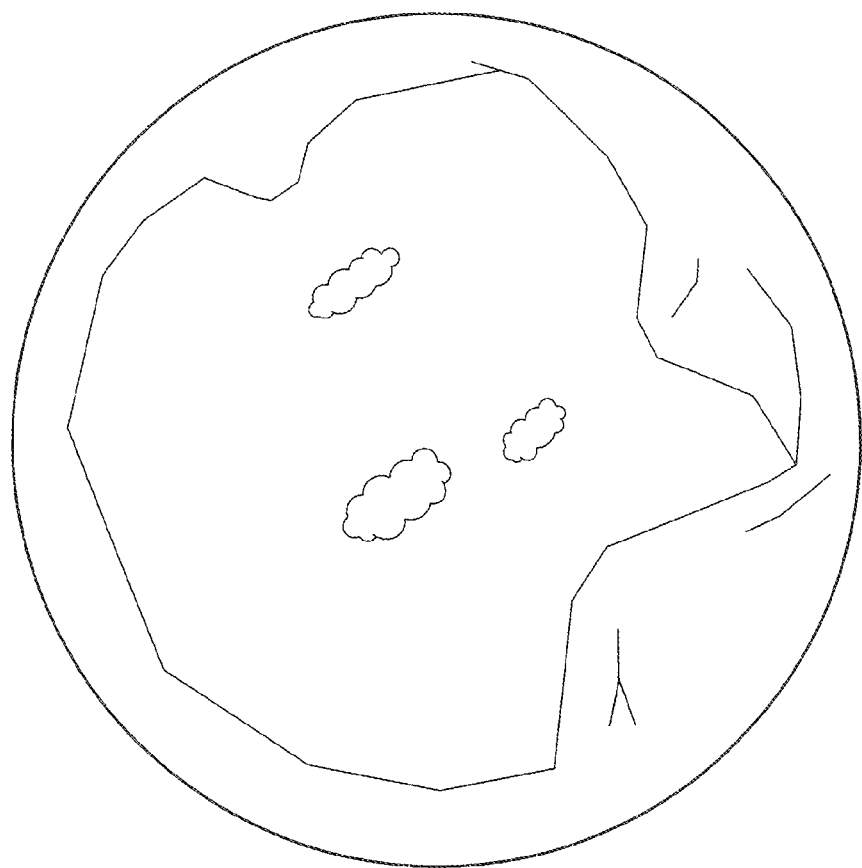
FIG. 3 shows a first example of a moving image generated through imaging by an imaging apparatus having a view angle of 360° in a horizontal direction.

FIG. 3 shows a first example of the moving image generated through imaging by an imaging apparatus having a view angle of 360° in the horizontal direction. Referring to FIG. 3, a moving image 21 is shown. For example, the moving image 21 is a ring-shaped whole-sky image. As the first example, the moving image acquisition unit 141 acquires such a ring-shaped whole-sky image.

Figure 4:
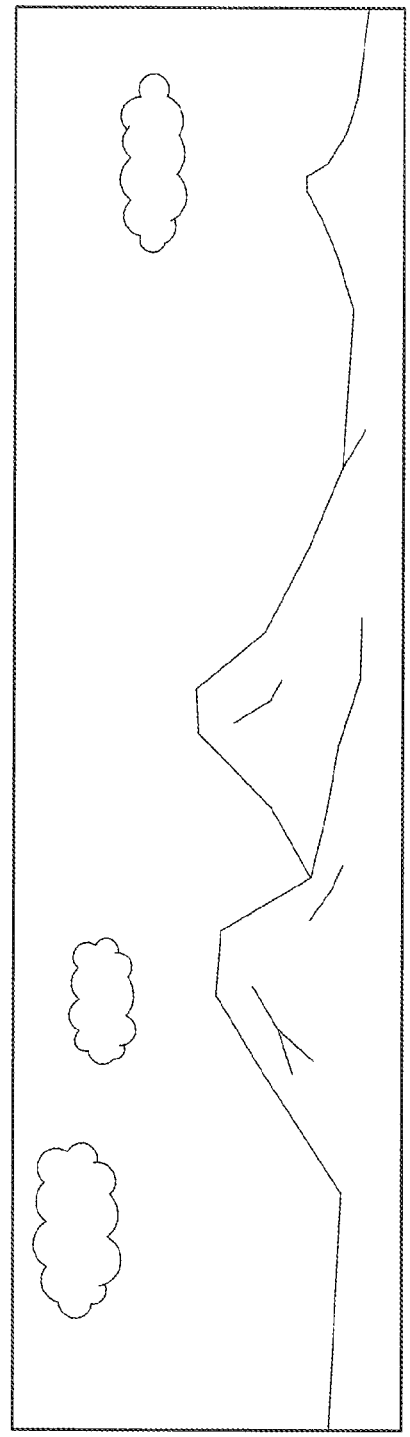
FIG. 4 shows a second example of a moving image generated through imaging by an imaging apparatus having a view angle of 360° in a horizontal direction.

FIG. 4 shows a second example of the moving image generated through imaging by an imaging apparatus having a view angle of 360° in the horizontal direction. Referring to FIG. 4, a moving image 23 is shown. For example, the moving image 23 is a rectangular or substantially rectangular panorama image. As the second example, the moving image acquisition unit 141 acquires such a panorama image.

For example, the moving image is stored in the storage unit 130, and the moving image acquisition unit 141 acquires the moving image stored in the storage unit 130. Further, for example, the moving image is provided to the information processing apparatus 100 by another device, and the moving image acquisition unit 141 acquires the provided moving image through the communication unit 120.

Note that in a case in which the moving image acquisition unit 141 acquires, as the moving image, a whole-sky image such as the image shown in FIG. 3, the moving image acquisition unit 141 may convert the moving image into a panorama image such as the image shown in FIG. 4.

(Virtual Space Generation Unit 143)

The virtual space generation unit 143 generates a three-dimensional virtual space including one or more objects having a curved inner surface and a curved outer surface, on the basis of a plurality of frame images included in the moving image. Note that specific content of the generated three-dimensional virtual space will be described later in detail.

(Image Generation Unit 145)

The image generation unit 145 generates an image of the three-dimensional virtual space seen from any position within the three-dimensional virtual space. Note that specific content of the generated image will be described later in detail.

(Display Control Unit 147)

The display control unit 147 controls the display of the screen, performed by the display device 11. That is, the display control unit 147 causes the display device 11 to display the screen.

For example, the display control unit 147 generates screen information of the screen displayed by the display device 11, and provides the screen information to the display device 11 through the input/output unit 110. In this embodiment, for example, the display control unit 147 generates the screen information of the screen including the image generated by the virtual space generation unit 143, and provides the screen information to the display device 11 through the input/output unit 110.

2.2. Hardware Configuration

Figure 5:
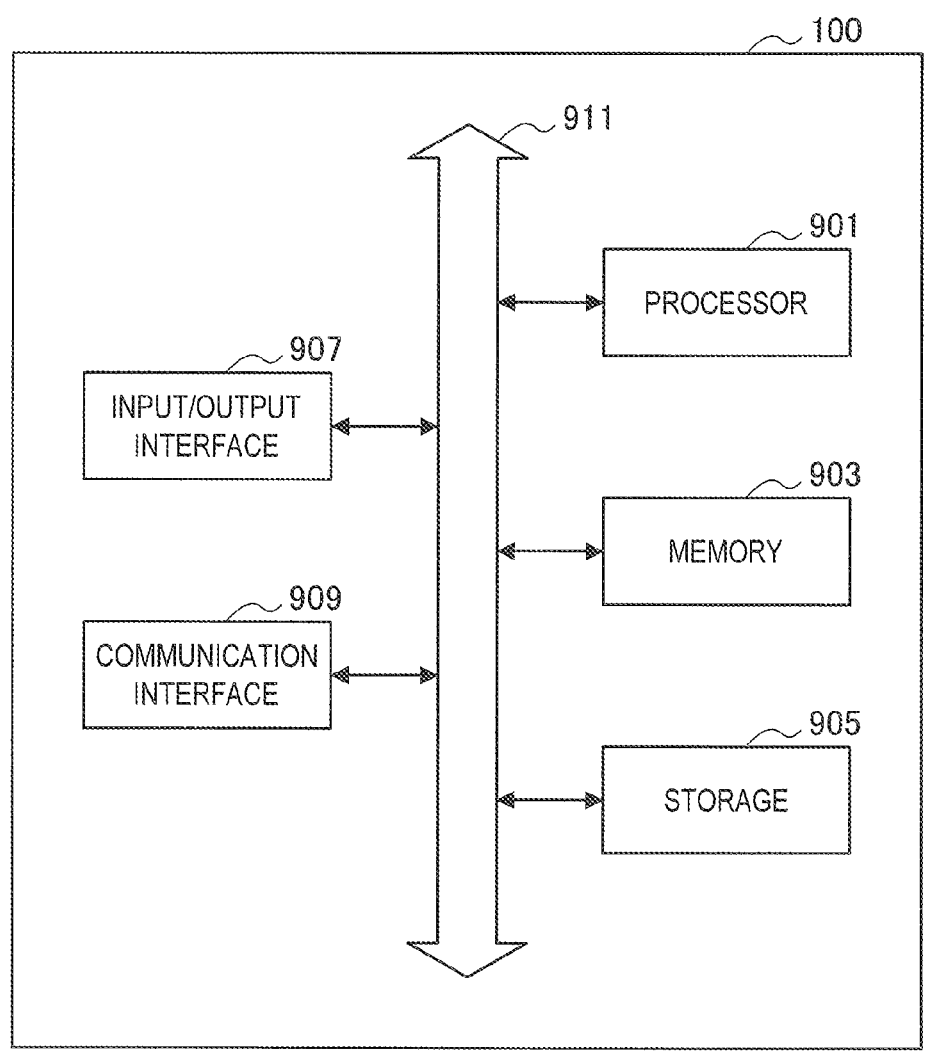
FIG. 5 is a block diagram showing an example of a hardware configuration of an information processing apparatus 100 according to an embodiment.

Next, an example of a hardware configuration of the information processing apparatus 100 according to this embodiment will be described with reference to FIG. 5. FIG. 5 is a block diagram showing the example of the hardware configuration of the information processing apparatus 100 according to this embodiment. Referring to FIG. 5, the information processing apparatus 100 includes a processor 901, memory 903, a storage 905, an input/output interface 907, a communication interface 909, and a bus 911.

Examples of the processor 901 include a central processing unit (CPU), a digital signal processor (DSP), and a system on chip (SoC), and the processor 901 performs various kinds of processing of the information processing apparatus 100. The memory 903 includes random access memory (RAM) and read only memory (ROM), and stores a program and data executed by the processor 901. The storage 905 may include a storage medium such as a semiconductor memory or a hard disk.

The input/output interface 907 connects a device such as the display device 11 or the input device 13 to the information processing apparatus 100, for example. The input/output interface 907 may include a universal serial bus (USB) terminal, a digital visual interface (DVI) terminal, a high-definition multimedia interface (HDMI, registered trademark) terminal, or the like.

The communication interface 909 is communication means included in the information processing apparatus 100, and communicates with another device via a network (or directly). The communication interface 909 may be an interface for wired communication, in which case the communication interface 909 may include a LAN terminal, a transfer circuit, and a circuit for other communication processing, for example. Further, the communication interface 909 may be an interface for wireless communication, in which case the communication interface 909 may include a communication antenna, an RF circuit, and a circuit for other communication processing, for example.

The bus 911 connects the processor 901, the memory 903, the storage 905, the input/output interface 907, and the communication interface 909 to each other. The bus 911 may include plural kinds of busses.

3. Generation of Three-Dimensional Virtual Space

Next, the generation of the three-dimensional virtual space according to this embodiment will be described with reference to FIG. 6 to FIG. 18.

3.1. Basic Generation of Three-Dimensional Virtual Space

First, the generation of a basic three-dimensional virtual space according to this embodiment will be described with reference to FIG. 6 to FIG. 11.

(Virtual Space Generation Unit 143)

As described above, particularly in this embodiment, the virtual space generation unit 143 generates the three-dimensional virtual space including one or more objects having a curved inner surface and a curved outer surface, on the basis of a plurality of frame images included in the moving image.

Further, in this embodiment, the virtual space generation unit 143 generates the three-dimensional virtual space in a manner that, for each of the one or more objects, a frame image included in the plurality of frame images is mapped on at least one of the curved inner surface and the curved outer surface.

For example, the three-dimensional virtual space includes a plurality of objects each having a curved inner surface and a curved outer surface.

Example of Individual Object

For example, each of the plurality of objects further includes a side surface. As a specific example, each of the plurality of objects is a cylindrical object. The specific example of the cylindrical object will be described below with reference to FIG. 6.

Figure 6:
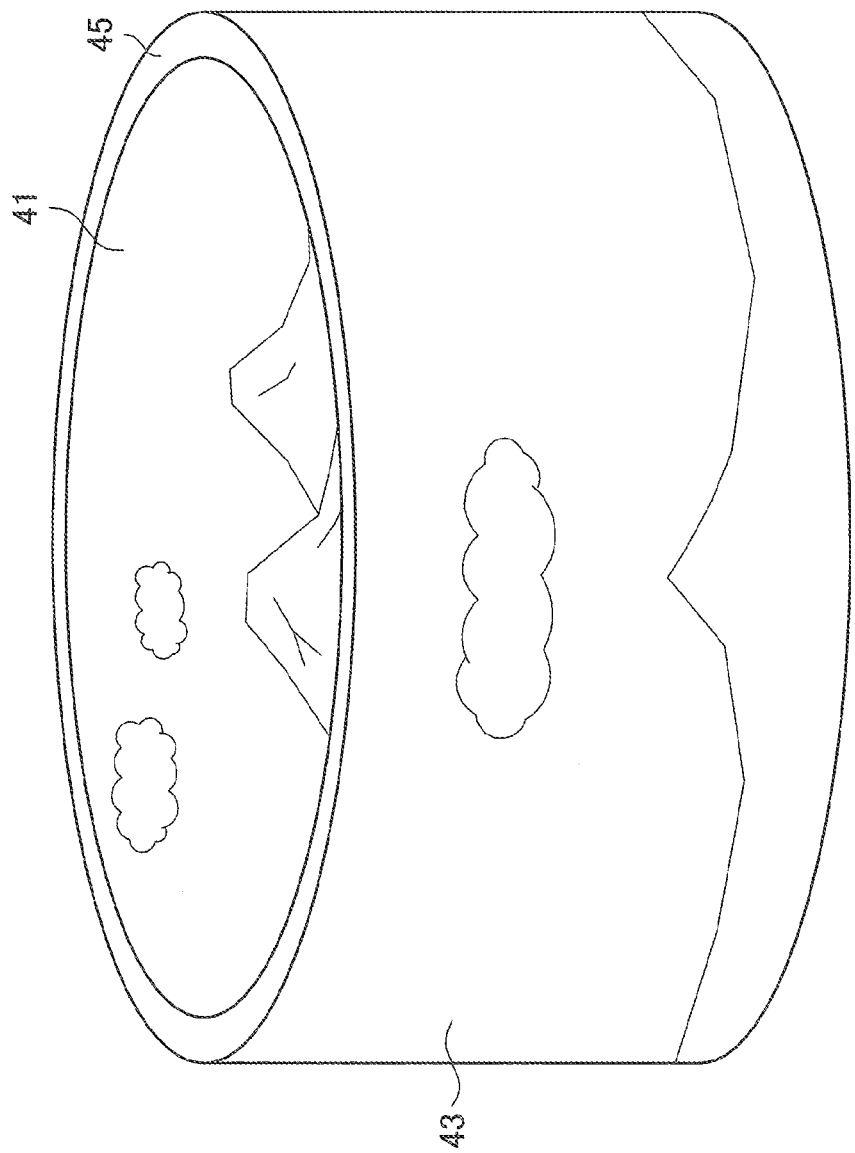
FIG. 6 shows a specific example of an object according to an embodiment.

FIG. 6 shows a specific example of the object according to this embodiment. Referring to FIG. 6, a cylindrical object 31 is shown. The cylindrical object 31 includes a curved inner surface 41 and a curved outer surface 43. The cylindrical object 31 further includes a side surface 45. In this example, on the inner surface 41 and the outer surface 43 of the cylindrical object 31, a frame image of the moving image 23 shown in FIG. 4 is mapped as texture.

Arrangement Relation of Plurality of Objects

Further, for example, the plurality of objects are laminated in a manner that the inner surface of one of two adjacent objects is superposed on the outer surface of the other. A specific example of the plurality of objects included in the three-dimensional virtual space will be described below with reference to FIG. 7 and FIG. 8.

Figure 7:
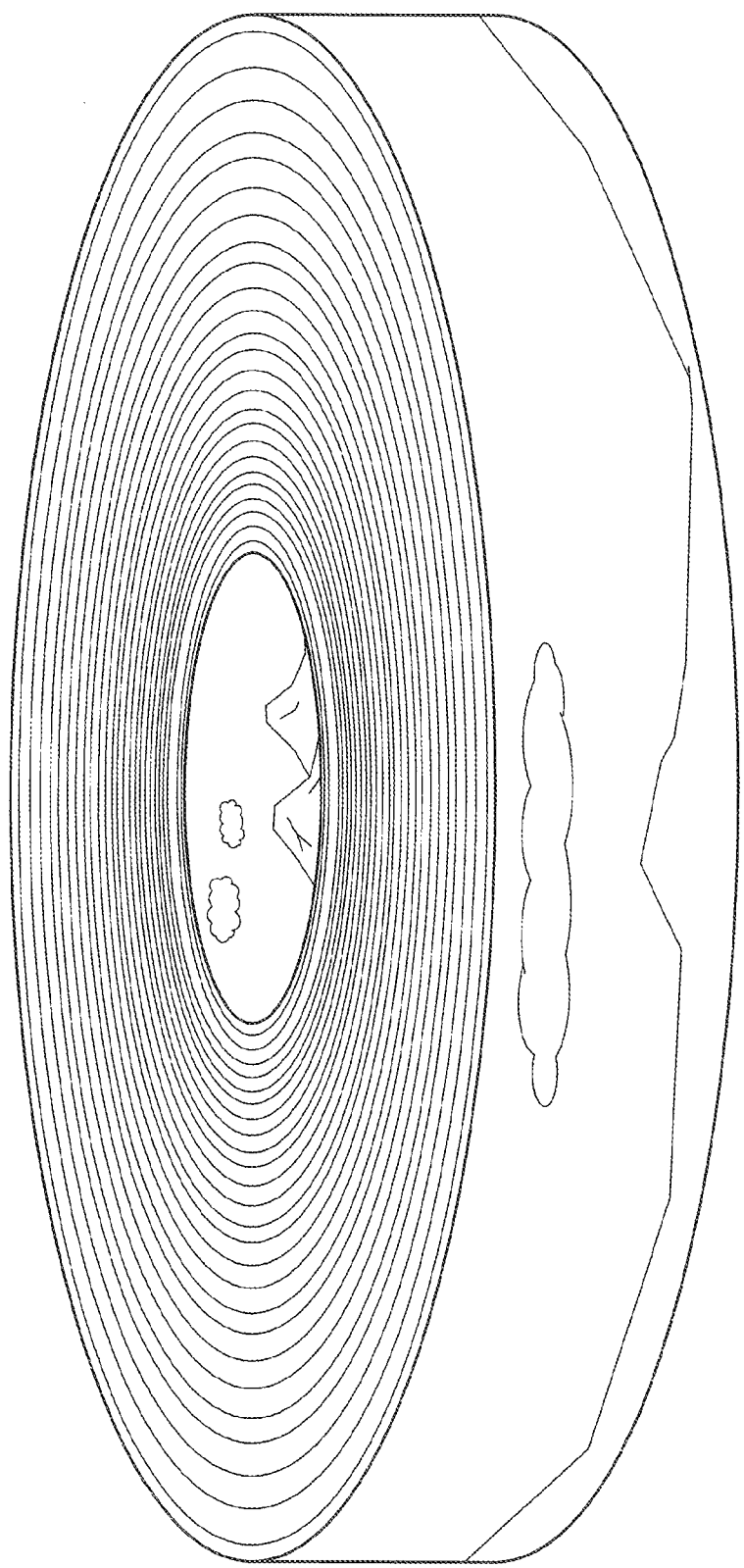
FIG. 7 shows an example of a plurality of objects included in a three-dimensional virtual space.

FIG. 7 shows an example of the plurality of objects included in the three-dimensional virtual space. Referring to FIG. 7, an object group 33 is shown. The object group 33 includes a plurality of the cylindrical objects 31, and among the plurality of cylindrical objects 31, the inner surface of one of two adjacent cylindrical objects 31 is superposed on the outer surface of the other. Accordingly, in this manner, the plurality of cylindrical objects 31 are laminated like baumkuchen, for example.

Figure 8:
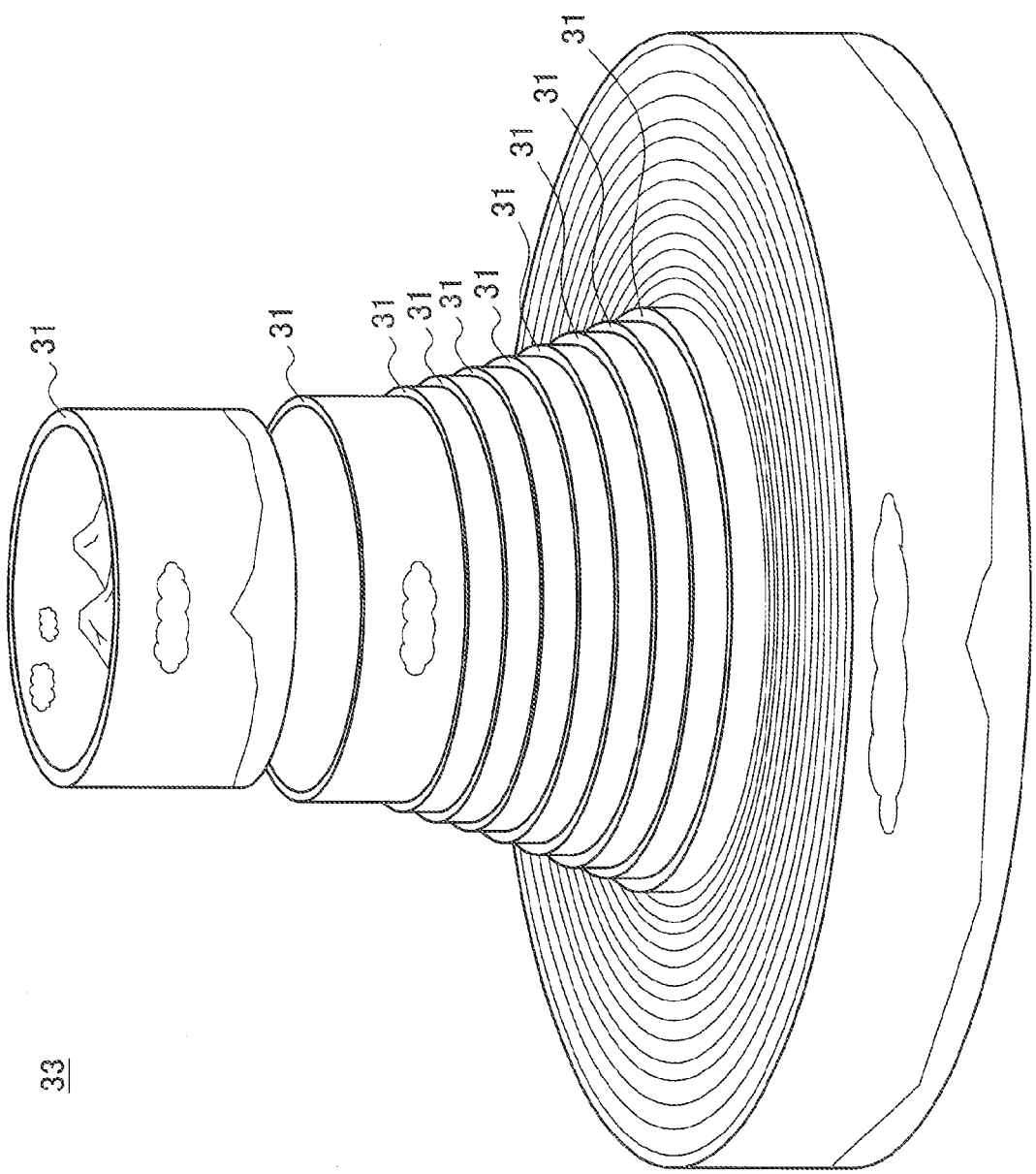
FIG. 8 shows items of an example of a plurality of objects included in a three-dimensional virtual space.

FIG. 8 shows the items of the example of the plurality of objects included in the three-dimensional virtual space. Referring to FIG. 8, the plurality of cylindrical objects 31 included in the object group 33 shown in FIG. 7 are shown. In the object group 33 included in the generated three-dimensional virtual space, for example, the cylindrical objects 31 are laminated in this manner. Note that the example of FIG. 8 is just an example for explaining the items of the object group 33 shown in FIG. 7, and it should be noted that the three-dimensional virtual space including the object group 33 in the state shown in FIG. 8 is not generated.

Note that the plurality of cylindrical objects 31 have the same height and thickness, for example. That is, the inner surfaces (and the outer surfaces) of the plurality of cylindrical objects 31 have the same height, and the side surfaces of the plurality of objects have the same width. As a specific example, each of the plurality of objects has a height H and a thickness 1. Further, an N-th cylindrical object from the inside of the plurality of objects has an internal diameter $I_N$ and an external diameter $O_N$. The internal diameter $I_N$ and the external diameter $O_N$ can be expressed as follows, for example.

$$I_N = I_1 + N - 1$$

$$O_N = I_N + 1 = I_1 + N$$

Relation Between Plurality of Objects and Plurality of Frame Images

For example, each of the plurality of objects corresponds to a frame image included in the plurality of frame images. Further, among the plurality of objects, among the plurality of objects, an object that is closer to a position inside the plurality of objects corresponds to an earlier frame image among the plurality of frame images than an object that is more distant from the position.

More specifically, for example, each of the plurality of objects corresponds to any one of the plurality of frame images. Further, among the plurality of objects, an object that is closer to the position inside the plurality of objects corresponds to one earlier frame image among the plurality of frame images than an object that is more distant from the position. That is, in the three-dimensional virtual space, the number of the arranged objects is the same as the number of the plurality of frame images included in the moving image, and among the plurality of objects, the N-th object from the inside corresponds to an N-th frame image among the plurality of frame images.

Referring to FIG. 7 and FIG. 8 again, for example, among the plurality of cylindrical objects 31 included in the object group 33, the innermost cylindrical object 31 corresponds to the first frame image among the plurality of frame images. Further, among the plurality of cylindrical objects 31 included in the object group 33, the tenth cylindrical object 31 from the inside corresponds to the tenth frame image among the plurality of frame images. Furthermore, among the plurality of cylindrical objects 31 included in the object group 33, the outermost cylindrical object 31 corresponds to the last frame image among the plurality of frame images.

Mapping of Frame Image on Inner Surface and/or Outer Surface of Object

For example, the virtual space generation unit 143 generates the three-dimensional virtual space in a manner that, for each of the plurality of objects, a corresponding frame image is mapped on at least one of the curved inner surface and the curved outer surface.

More specifically, for example, the virtual space generation unit 143 generates the three-dimensional virtual space in a manner that, for each of the plurality of objects, one corresponding frame image is mapped on at least one of the curved inner surface and the curved outer surface.

Referring to FIG. 6 to FIG. 8 again, for example, on the inner surface 41 and the outer surface 43 of the N-th cylindrical object 31 from the inside of the plurality of cylindrical objects 31 included in the object group 33, the N-th frame image among the plurality of frame images is mapped as texture.

Note that the frame image mapped on the inner surface and the outer surface of the cylindrical object is converted into a panorama image having a size that is suitable for the cylindrical object. The vertical width of the panorama image is the height H of the cylindrical object. Further, a horizontal width $W_N$ of the panorama image to be mapped on the inner surface of the N-th cylindrical object from the inside of the plurality of the cylindrical objects is the inner circumference of the cylindrical object, as shown below.

$$W_N = \pi I_N = \pi(I_1 + N - 1) = W_1 + \pi(N-1)$$

As described above, $I_N$ is the internal diameter of the N-th cylindrical object from the inside of the plurality of the cylindrical objects.

For example, on the inner surface 41 of the cylindrical object 31, the frame image is mapped without any change, while on the outer surface 43 of the cylindrical object 31, a frame image that is subjected to lateral inversion is mapped.

Mapping of Image on Side Surface of Object

Further, for example, the virtual space generation unit 143 generates the three-dimensional virtual space in a manner that, for each of the plurality of objects, an image generated on the basis of the corresponding frame image is mapped on the side surface.

More specifically, for example, the virtual space generation unit 143 generates the three-dimensional virtual space in a manner that, for each of the plurality of objects, an image generated on the basis of one corresponding frame image is mapped on the side surface.

Referring to FIG. 6 to FIG. 8 again, for example, among the plurality of cylindrical objects 31 included in the object group 33, on the side surface 45 of the innermost cylindrical object 31, an image generated on the basis of the first frame image among the plurality of frame images is mapped. Further, among the plurality of cylindrical objects 31 included in the object group 33, on the side surface 45 of the tenth cylindrical object 31 from the inside, an image generated on the basis of the tenth frame image among the plurality of frame images is mapped. Furthermore, among the plurality of cylindrical objects 31 included in the object group 33, on the side surface 45 of the outermost cylindrical object 31, an image generated on the basis of the last frame image among the plurality of frame images is mapped.

Note that each pixel of the image mapped on the side surface of the object is a pixel generated on the basis of a group of pixels aligned in a certain direction in the corresponding frame image, for example. As an example, each pixel of the image mapped on the side surface of the object is a pixel having an average pixel value of the group of pixels. A specific example on this point will be described below with reference to FIG. 9.

Figure 9:
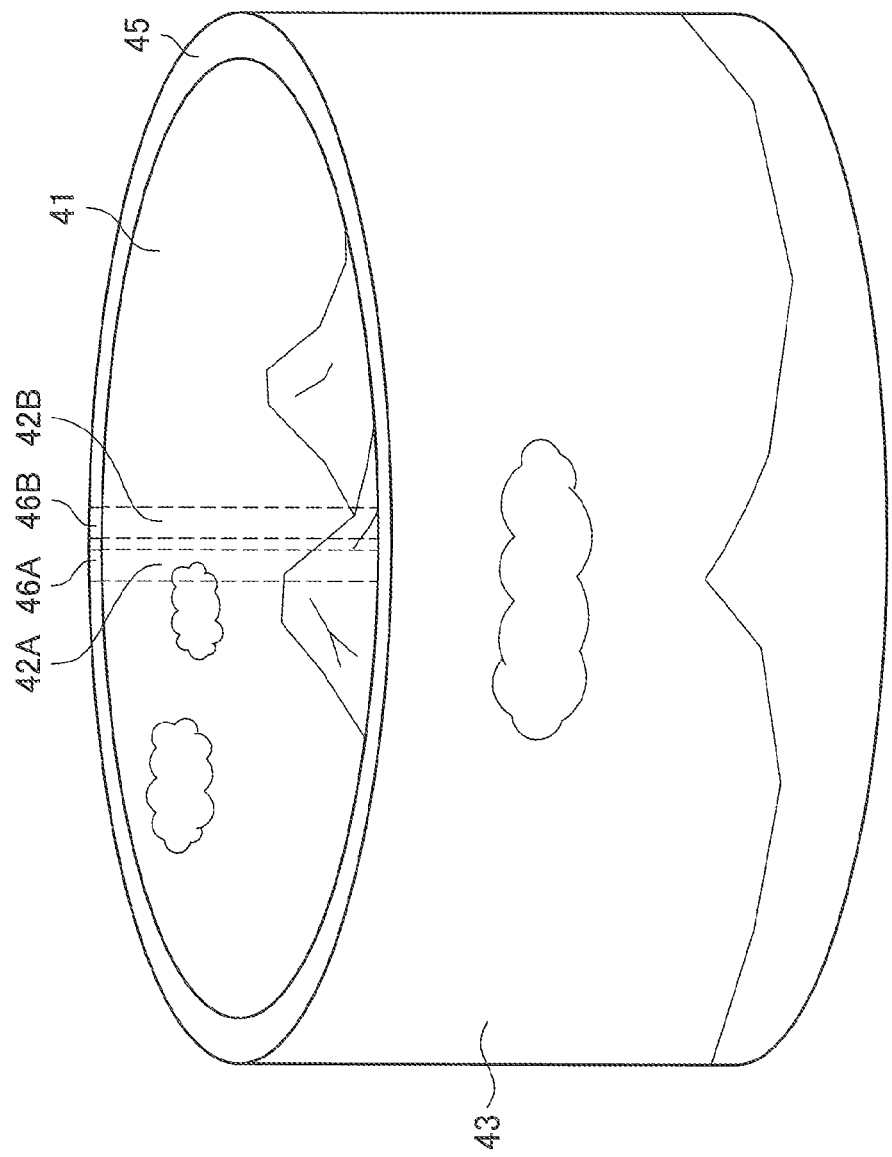
FIG. 9 shows an example of an image mapped on a side surface of an object.

FIG. 9 shows an example of an image mapped on the side surface of the object. Referring to FIG. 9, as in FIG. 6, the cylindrical object 31 is shown. For example, a pixel mapped on a part 46A in the side surface 45 of the cylindrical object 31 is a pixel generated on the basis of a group of pixels mapped on a part 42A in the inner surface 41 (e.g., a pixel having the average pixel value in the group). Further, a pixel mapped on a part 46B in the side surface 45 of the cylindrical object 31 is a pixel generated on the basis of a group of pixels mapped on a part 42B in the inner surface 41 (e.g., a pixel having the average pixel value in the group).

Another Example of Plurality of Objects

As described above, for example, each of the plurality of objects is the cylindrical object. In the example described with reference to FIG. 7, the height of the cylindrical objects 31 included in the object group 33 is equal. However, this embodiment is not limited to this example.

For example, among the plurality of objects, an object that is more distant from the position inside the plurality of objects may have a larger height than an object that is closer to the position. A specific example on this point will be described below with reference to FIG. 10.

Figure 10:
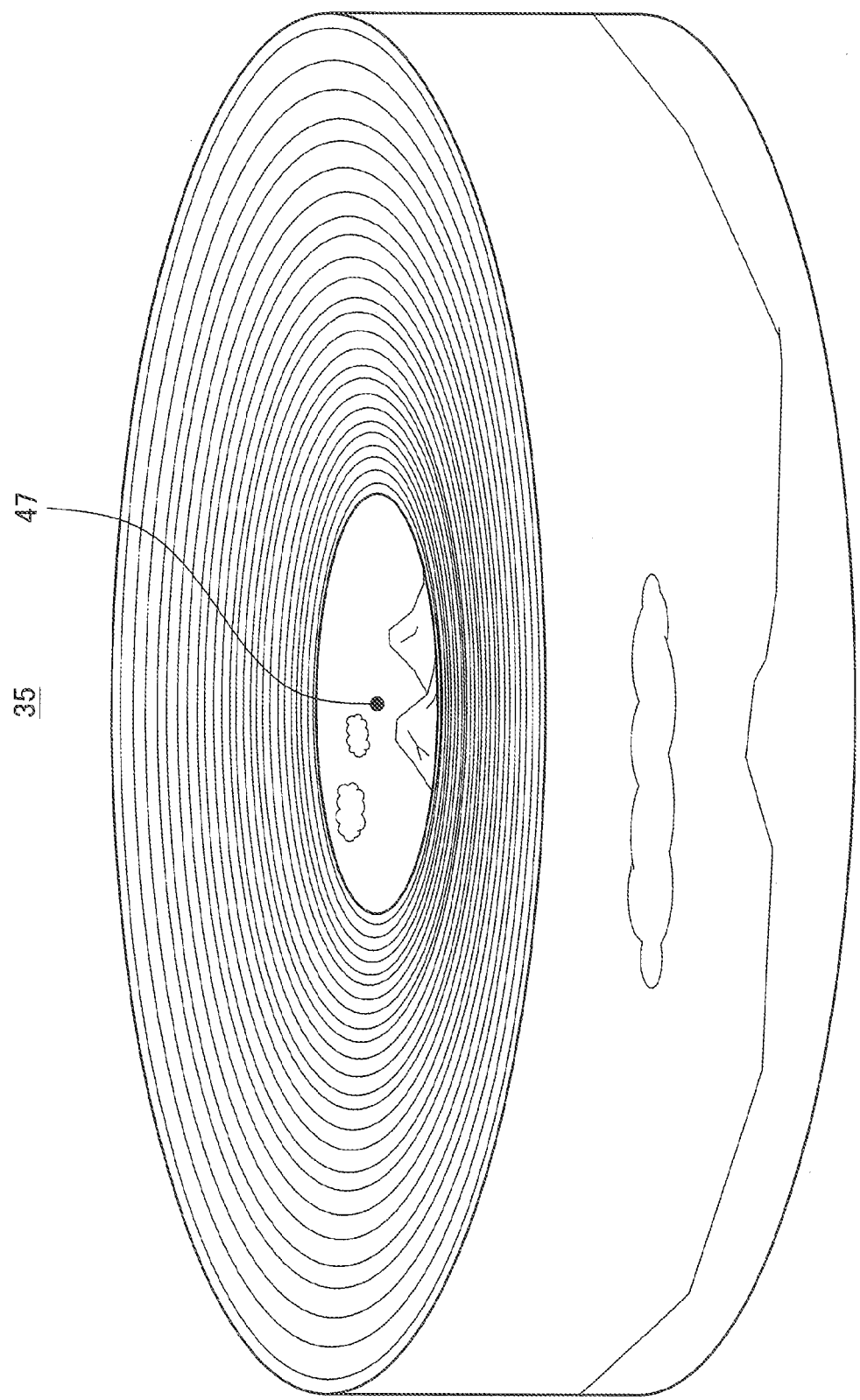
FIG. 10 shows another example of a plurality of objects included in a three-dimensional virtual space.

FIG. 10 shows another example of the plurality of objects included in the three-dimensional virtual space. Referring to FIG. 10, an object group 35 is shown. The object group 35 includes the plurality of cylindrical objects. Further, among the plurality of cylindrical objects, an object that is more distant from a center 47 of the object group 35 has a larger height than an object that is closer to the center 47.

Note that, among the plurality of cylindrical objects included in the object group 35, a height $H_N$ of the N-th cylindrical object from the inside can be expressed as follows.

$$H_N = H_1 \frac{I_N}{I_1} = H_1 \times \left(1 + \frac{(N-1)}{I_1}\right)$$

As described above, $I_N$ is the internal diameter of the N-th cylindrical object from the inside of the plurality of the cylindrical objects.

(Flow of Processing)

Figure 11:
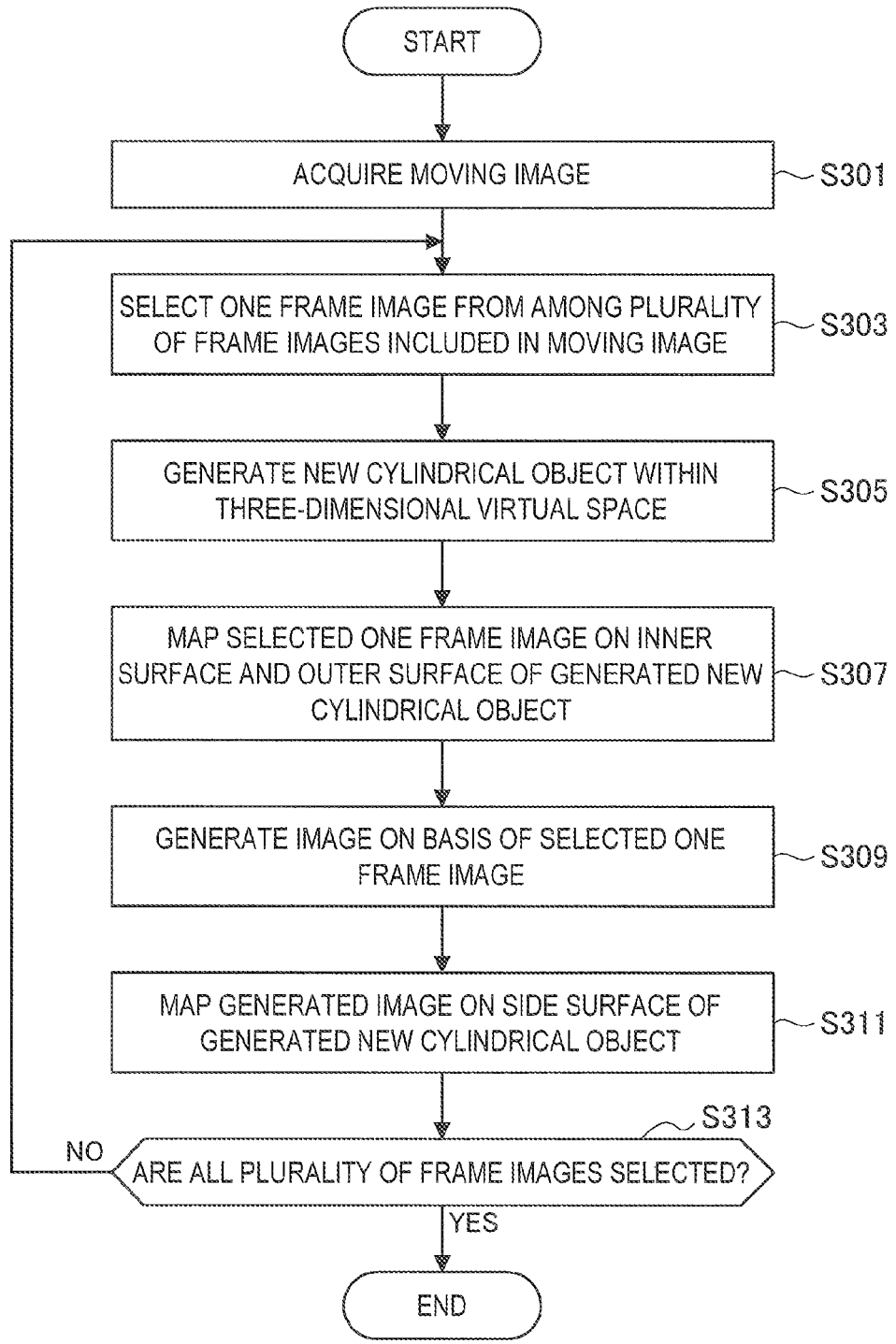
FIG. 11 is a flowchart showing an example of a schematic flow of processing for generating a basic three-dimensional virtual space according to an embodiment.

FIG. 11 is a flowchart showing an example of a schematic flow of processing for generating the basic three-dimensional virtual space according to this embodiment.

First, the moving image acquisition unit 141 acquires the moving image generated through imaging by the imaging apparatus having a view angle of 180° or more (S301).

The virtual space generation unit 143 selects one frame image from among the plurality of frame images included in the moving image (S303).

Further, the virtual space generation unit 143 generates a new cylindrical object within the three-dimensional virtual space (S305). Note that in a case in which one or more cylindrical objects have already been generated, the new cylindrical object is generated in a manner that the inner surface of the new cylindrical object is superposed on the outer surface of the outermost cylindrical object among the one or more cylindrical objects.

Next, the virtual space generation unit 143 maps the selected one frame image on the inner surface and the outer surface of the generated new cylindrical object (S307).

Further, the virtual space generation unit 143 generates an image on the basis of the selected one frame image (S309). Then, the virtual space generation unit 143 maps the generated image on the side surface of the generated new cylindrical object (S311).

Then, when all the plurality of frame images included in the moving image are selected (S313: YES), the processing ends; otherwise (S313: NO), the processing returns to the step S303.

(Conclusion)

As described above, the three-dimensional virtual space is generated. Thus, it becomes possible to intuitively recognize circumstances of a subject from a moving image generated through an imaging apparatus having a wide view angle.

More specifically, for example, it becomes possible to recognize circumstances of a subject more intuitively by setting a viewpoint within the three-dimensional virtual space and seeing the inner surface or the outer surface of the object from the viewpoint. As an example, it becomes possible to easily recognize the place of the subject. As another example, it becomes possible to easily recognize the direction of the subject.

As described above, the three-dimensional virtual space includes the plurality of laminated objects. Thus, for example, it becomes possible to view a moving image of a sight in a desired direction, as will be described later.

Further, as described above, each of the plurality of laminated objects corresponds to any one of the plurality of frame images. Thus, it becomes possible to view a moving image of a sight in a desired direction at an original frame rate, as will be described later, for example.

Further, as described above, for example, for each of the plurality of objects, the image generated on the basis of the corresponding frame image is mapped on the side surface. Thus, it becomes possible to easily recognize a change in the time direction in the moving image generated through the imaging apparatus having a wide view angle, from the side surface of the plurality of objects included in the three-dimensional virtual space, for example. For example, in a case in which the imaging apparatus having a wide view angle (e.g., a view angle of 360°) is installed at a certain position and generates the moving image by imaging, it becomes possible to easily recognize a change in the moving image. As an example, it becomes possible to easily recognize movement of a person in the moving image (e.g., passage or entrance and exit of a person). As another example, it becomes possible to easily recognize a change in environment in the moving image (e.g., switching off of light, change of weather, or end of a presentation).

Further, as described above, for example, each pixel of the image mapped on the side surface is the pixel generated on the basis of the group of pixels aligned in the certain direction in the corresponding frame image. Thus, for example, it becomes possible to make an image of each part of the side surface of the object correspond to the image mapped on a corresponding part in the inner surface or the outer surface. Accordingly, it becomes possible to easily recognize the range where the change occurs in a wide imaged range.

3.2. Generation of Subset in Accordance with Specified Conditions

Next, the generation of a subset in accordance with specified conditions will be described with reference to FIG. 12 to FIG. 14.

(Virtual Space Generation Unit 143)

For example, the virtual space generation unit 143 generates a subset of the plurality of objects. In particular, for example, the subset is a set of one or more objects each corresponding to at least one of one or more frame images that satisfy specified conditions among the plurality of frame images.

As described above, for example, each of the plurality of objects corresponds to any one of the plurality of frame images included in the moving image. In this case, the subset is a set of one or more objects each corresponding to any one of the one or more frame images that satisfy specified conditions.

Further, for example, the virtual space generation unit 143 changes the size of one or more objects included in the subset when generating the subset. A specific example of the subset generated in this manner will be described below with reference to FIG. 12.

Figure 12:
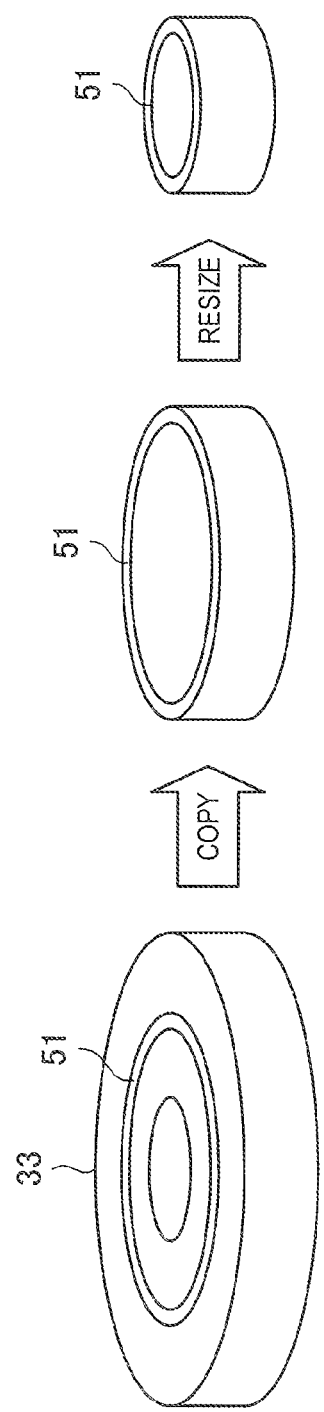
FIG. 12 shows a first example of generation of a subset in accordance with specified conditions.

FIG. 12 shows a first example of the generation of a subset in accordance with specified conditions. Referring to FIG. 12, the object group 33 including the plurality of objects is shown. For example, when a user specifies conditions, one or more frame images that satisfy the specified conditions are specified from among the plurality of frame images included in the moving image. Then, from among the plurality of cylindrical objects included in the object group 33, a set of one or more cylindrical objects each corresponding to any one of the specified one or more frame images, i.e., the object group 51, is specified. Then, the object group 51 is copied. Further, the size of the object group 51 is changed. For example, the object group 51 is downsized in a manner that the internal diameter of the object group 51 becomes equal to the internal diameter of the object group 33 (i.e., the internal diameter $I_1$). In this manner, the object group 51 is generated as a subset of the object group 33.

Figure 13:
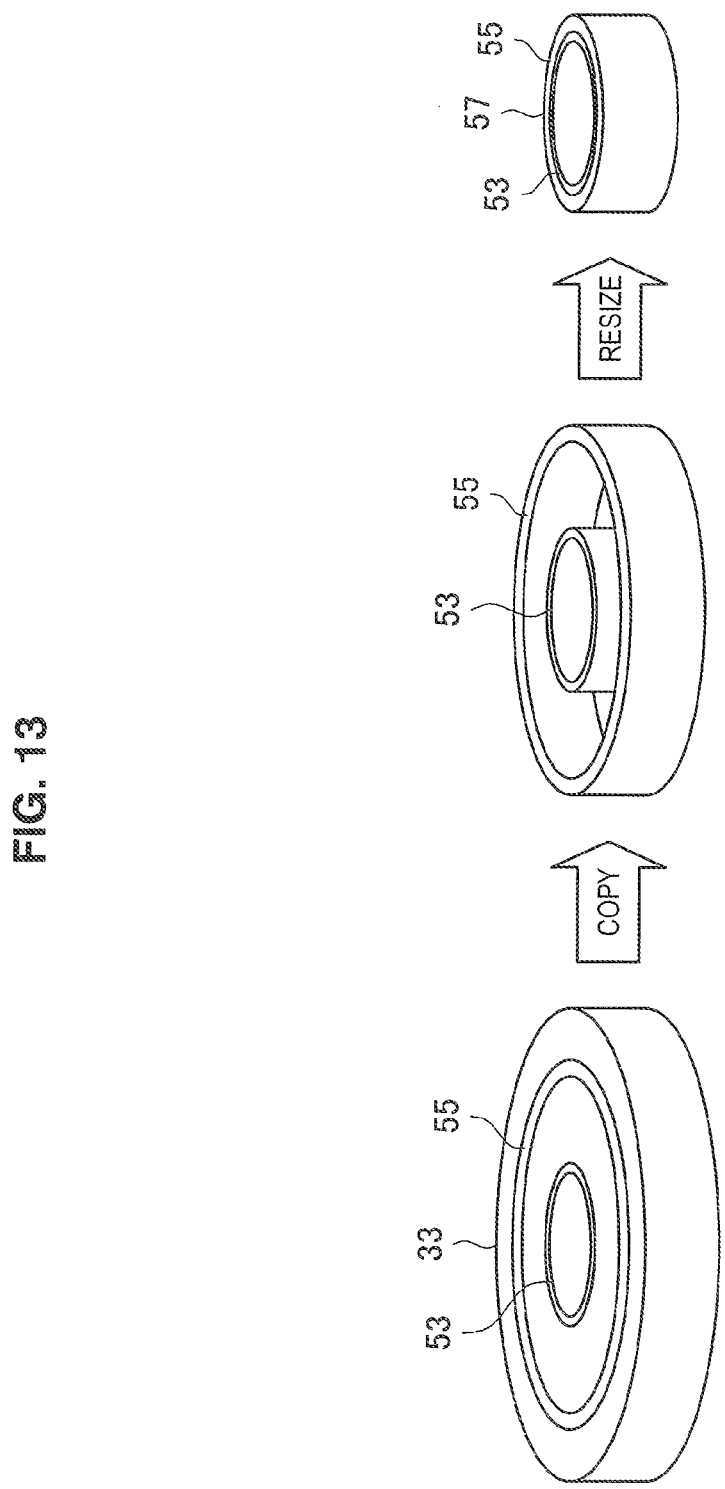
FIG. 13 shows a second example of generation of a subset in accordance with specified conditions.

FIG. 13 shows a second example of the generation of a subset in accordance with specified conditions. Referring to FIG. 13, the object group 33 including the plurality of objects is shown. For example, when a user specifies conditions, one or more frame images that satisfy the specified conditions are specified from among the plurality of frame images included in the moving image. Then, from among the plurality of cylindrical objects included in the object group 33, a set of one or more cylindrical objects each corresponding to any one of the specified one or more frame images, i.e., an object group 53 and an object group 55, are specified. Then, the object group 53 and the object group 55 are copied. Further, the size of the object group 55 is changed. For example, the object group 55 is downsized in a manner that the internal diameter of the object group 55 becomes equal to the external diameter of the object group 53 and the inner surface of the object group 55 is superposed on the outer surface of the object group 53. In this manner, the combination of the object group 53 and the object group 55 becomes a new object group 57. In this manner, the object group 57 is generated as a subset of the object group 33.

Further, the specified conditions may be, for example, a specific person being imaged, the brightness being certain brightness or more, the sound being a certain volume or more, a motion of the subject, or a temporal condition (e.g., correspondence to a specific time). A variety of conditions may be specified by a user or automatically.

A subset in accordance with the conditions specified is generated in this manner. Thus, for example, it becomes possible to intuitively recognize circumstances of a subject in a part of the moving image where the specified conditions are satisfied. Further, for example, it becomes possible to view the part of the moving image where the specified conditions are satisfied by use of the three-dimensional virtual space.

Note that the subset in accordance with the specified conditions (e.g., the object group 51 or the object group 57) may be generated in a new three-dimensional virtual space. Alternatively, the subset may be generated in the existing three-dimensional virtual space where the plurality of objects (e.g., the object group 33) are arranged.

(Flow of Processing)

Figure 14:
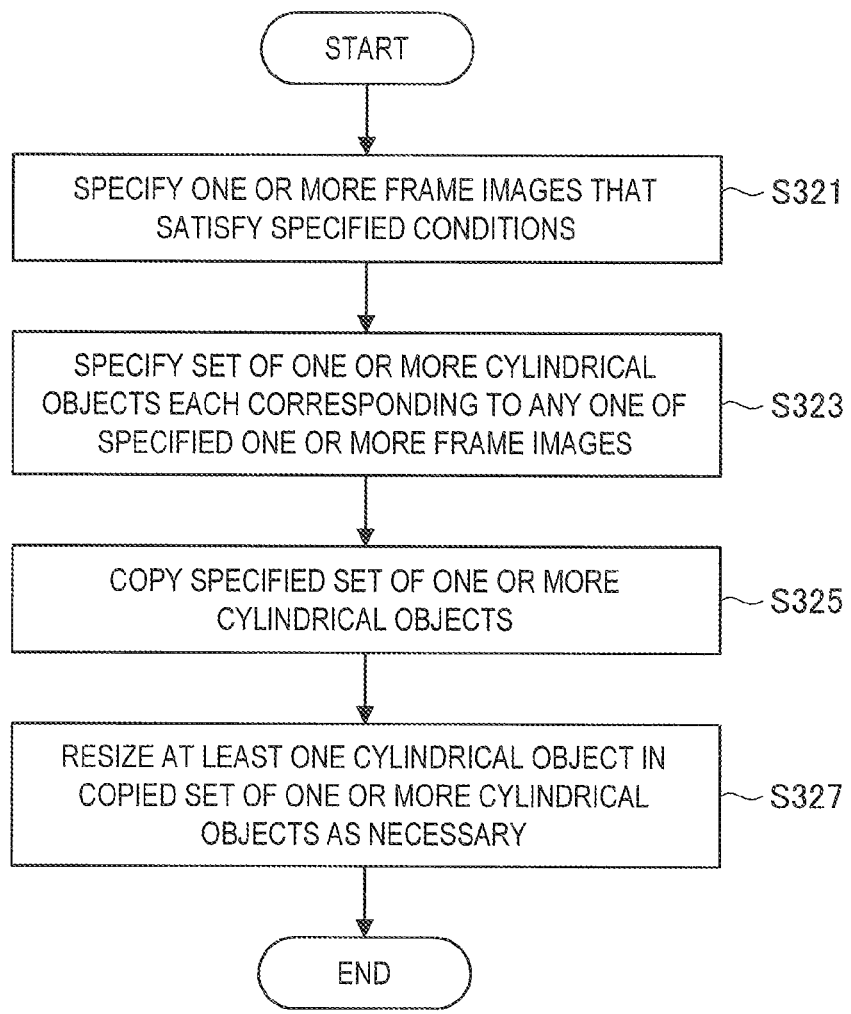
FIG. 14 is a flowchart showing a schematic flow of processing for generating a subset in accordance with specified conditions according to an embodiment.

FIG. 14 is a flowchart showing a schematic flow of processing for generating the subset in accordance with the specified conditions according to this embodiment.

First, one or more frame images that satisfy the specified conditions are specified (S321). Then, a set of one or more cylindrical objects each corresponding to any one of the specified one or more frame images is further specified (S323).

Then, the virtual space generation unit 143 copies the specified set of the one or more cylindrical objects (S325). Further, the virtual space generation unit 143 resizes at least one cylindrical object in the copied set of the one or more cylindrical objects as necessary (S327).

3.3. Generation of Subset in Accordance with Scene

Next, the generation of a subset in accordance with a scene will be described with reference to FIG. 15 and FIG. 16.

(Virtual Space Generation Unit 143)

For example, the virtual space generation unit 143 generates a subset of the plurality of objects. In particular, for example, the subset is a set of one or more objects each corresponding to at least one of one or more frame images that are within one scene of the plurality of frame images.

As described above, for example, each of the plurality of objects corresponds to any one of the plurality of frame images included in the moving image. In this case, the subset is a set of one or more objects each corresponding to any one of the one or more frame images that are within one scene.

Further, for example, the virtual space generation unit 143 resizes one or more objects included in the subset when generating the subset. A specific example of the subset generated in this manner will be described below with reference to FIG. 15.

Figure 15:
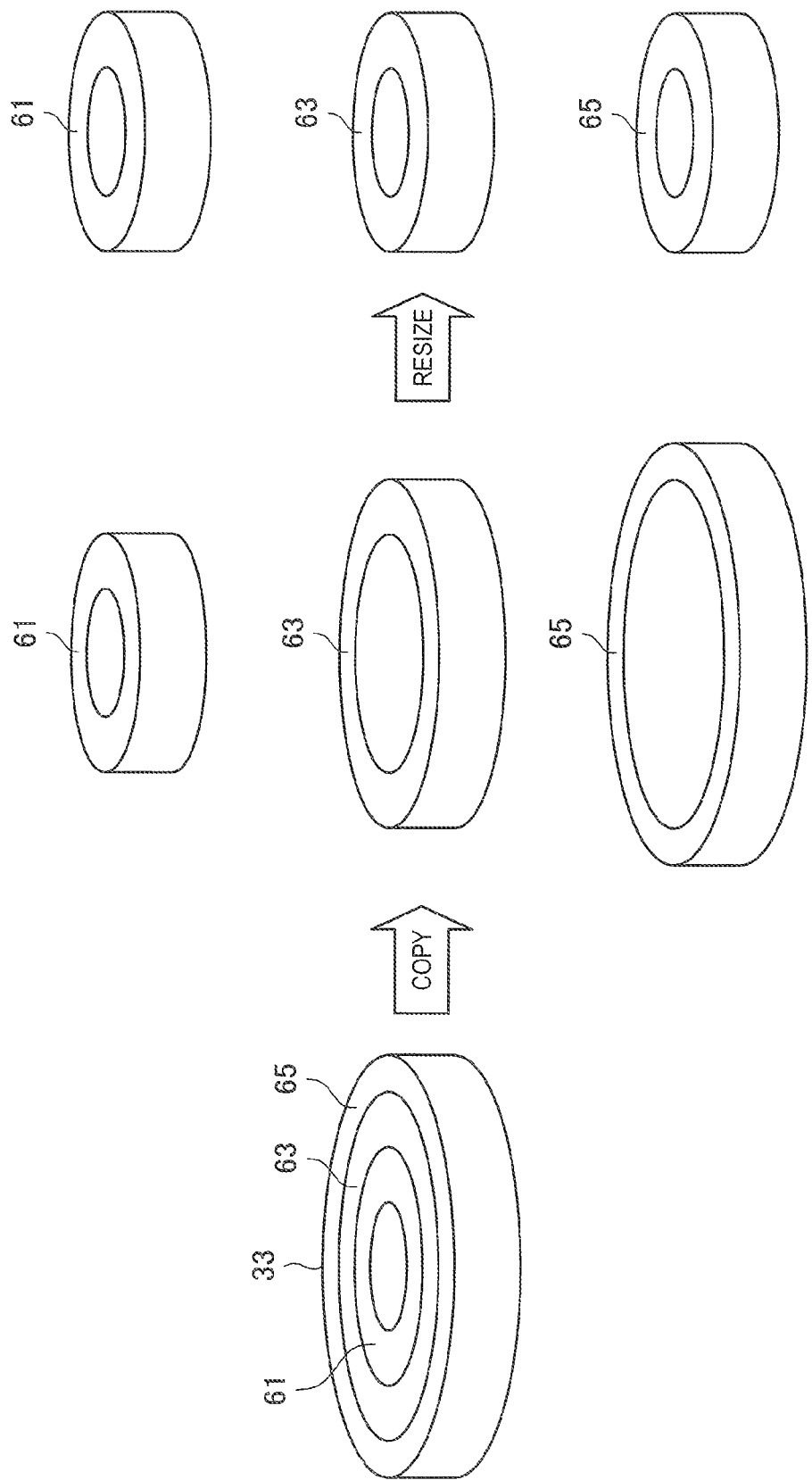
FIG. 15 shows an example of generation of subsets in accordance with scenes.

FIG. 15 shows an example of the generation of subsets in accordance with scenes. Referring to FIG. 15, the object group 33 including a plurality of objects is shown. A plurality of wireless frames included in a moving image include three scenes. And the object group 33 includes an object group 61 including one or more objects each corresponding to any one of frame images within a first scene. Further, the object group 33 includes an object group 63 including one or more objects each corresponding to any one of frame images within a second scene. Furthermore, the object group 33 includes an object group 65 including one or more objects each corresponding to any one of frame images within a third scene. For example, the first scene is selected and frame images within the first scene are specified. Then, a set of one or more cylindrical objects each corresponding to any one of the specified frame images, i.e., the object group 61, is specified. Then, the object group 61 is copied. Further, the second scene is selected and frame images within the second scene are specified. Then, a set of cylindrical objects each corresponding to any one of the specified frame images, i.e., the object group 63, is specified. Then, the object group 63 is copied. Furthermore, the size of the object group 63 is changed. For example, the object group 63 is downsized in a manner that the internal diameter of the object group 63 becomes equal to the internal diameter of the object group 33 (i.e., the internal diameter $I_1$). The same processing is performed on the third scene, and the object group 65 is copied and downsized. In this manner, the object group 61, the object group 63, and the object group 65 are generated as subsets of the object group 33.

In this manner, subsets in accordance with scenes are generated. Thus, for example, it becomes possible to intuitively recognize circumstances of a subject within a specific scene in a moving image. Further, for example, it becomes possible to view the specific scene in the moving image by use of the three-dimensional virtual space.

Note that a subset (e.g., the object group 61, the object group 63, or the object group 65) in accordance with a scene may be generated in a new three-dimensional virtual space. In this case, two or more subsets may be generated in an identical and new three-dimensional virtual space or different new three-dimensional virtual spaces. Alternatively, the subsets may be generated in the existing three-dimensional virtual space in which the plurality of objects (e.g., the object group 33) are arranged.

(Flow of Processing)

Figure 16:
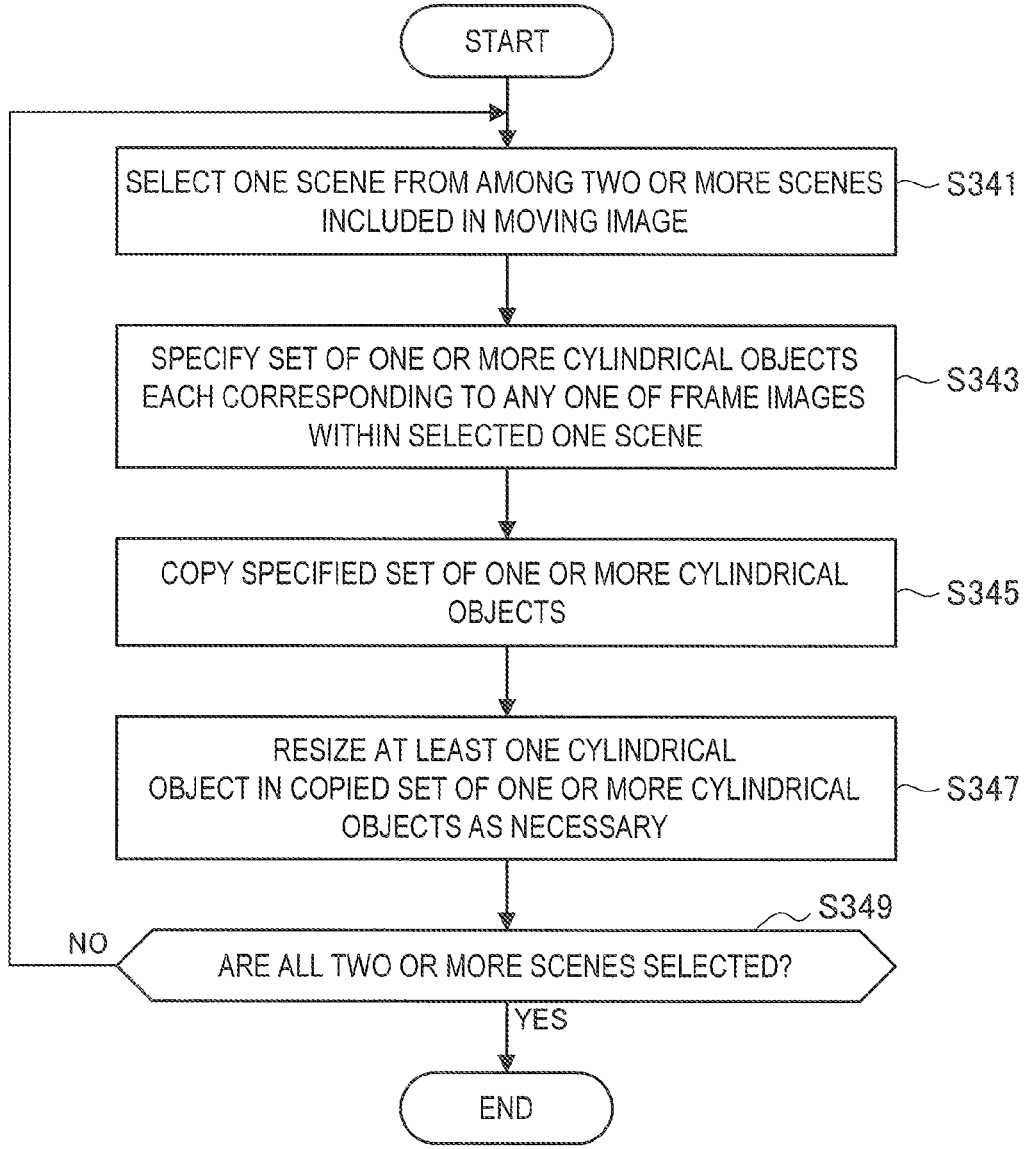
FIG. 16 is a flowchart showing an example of a schematic flow of processing for generating subsets in accordance with scenes according to an embodiment.

FIG. 16 is a flowchart showing an example of a schematic flow of processing for generating subsets in accordance with scenes according to this embodiment.

First, one scene is selected from among two or more scenes included in a moving image (S341). Then, further, a set of one or more cylindrical objects each corresponding to any one of frame images within the selected one scene (that is, an object group) is specified (S343).

Then, the virtual space generation unit 143 copies the specified set of the one or more cylindrical objects (S345). Further, the virtual space generation unit 143 resizes at least one cylindrical object in the copied set of the one or more cylindrical objects as necessary (S347).

When all the two or more scenes are selected (S349: YES), the processing ends; otherwise (S349: NO), the processing returns to the step S341.

3.4. Generation of Object by Cutting

Next, the generation of an object by cutting will be described with reference to FIG. 17 and FIG. 18.

(Virtual Space Generation Unit 143)

For example, the virtual space generation unit 143 generates one or more cut objects by cutting the one or more objects along one or more planes. A specific example of the cut objects generated in this manner will be described with reference to FIG. 17.

FIG. 17 shows an example of the generation of a cut object generated by cutting. Referring to FIG. 17, the object group 33 including a plurality of objects is shown. For example, the object group 33 is cut along two planes that are vertical to the side surface of the object group 33. As a result, a cut object group 71 and a cut object group 73 are generated. Then, the cut object group 71 and the cut object group 73 are copied. Note that the two planes for the cutting are specified by a user, for example. Further, the cut object group 71 includes one or more cut objects. The cut object group 73 also includes one or more cut objects.

The cut object generated by cutting is generated in this manner. Accordingly, for example, it becomes possible to intuitively recognize circumstances of a subject within a limited range in an imaged range. Further, for example, it becomes possible to view the limited range in the imaged range by use of a three-dimensional virtual space.

Furthermore, for example, the virtual space generation unit 143 generates the one or more cut objects in a manner that an image generated on the basis of the plurality of frame images is mapped on the cut plane of the one or more cut objects generated by the cutting.

Referring to FIG. 17 again, for example, the cut object group 71 includes a cut plane 72. An image generated on the basis of the plurality of frame images included in a moving image is mapped on the cut plane 72. Further, the cut object group 73 includes a cut plane 74. An image generated on the basis of the plurality of frame images included in the moving image is mapped on the cut plane 74.

Accordingly, for example, it becomes possible to easily recognize a change in the time direction in the moving image at various cut sections generated by the cutting.

Note that the cut object group (the cut object group 71 or the cut object group 73) may be generated in a new three-dimensional virtual space. In this case, two or more cut object groups may be generated in an identical and new three-dimensional virtual space or different new three-dimensional virtual spaces. Alternatively, the cut object groups may be generated in the existing three-dimensional virtual space in which the plurality of objects (e.g., the object group 33) are arranged.

(Flow of Processing)

Figure 18:
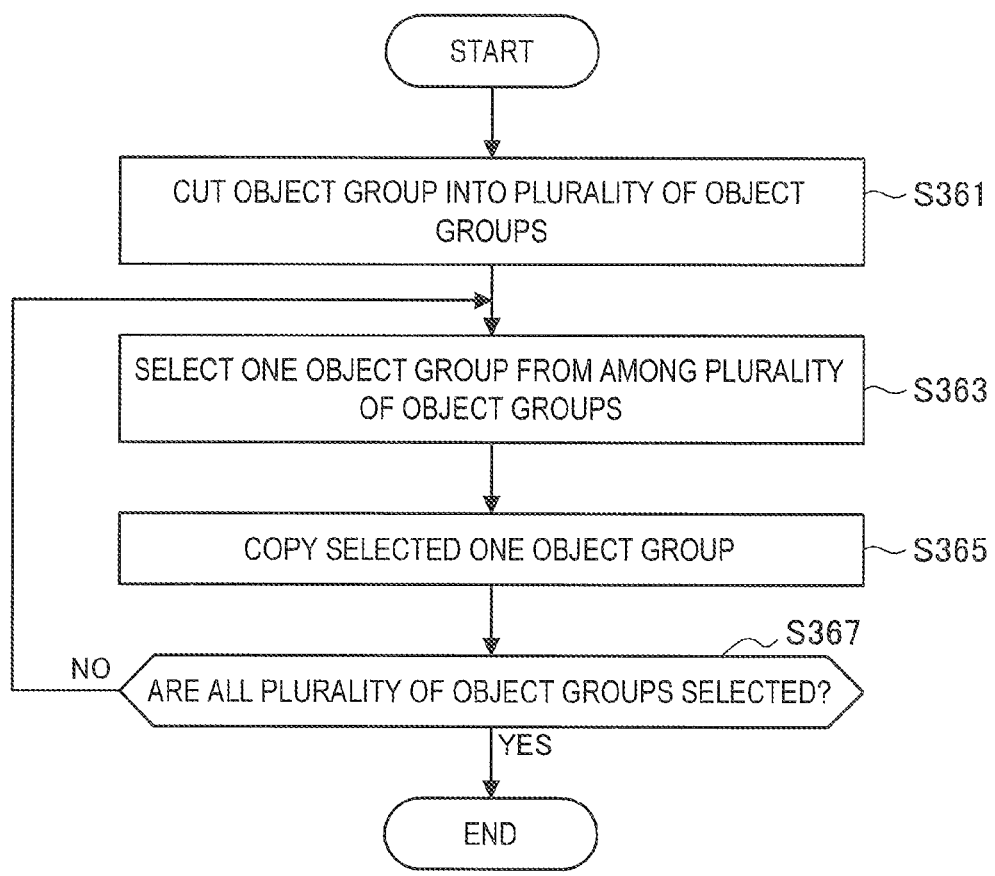
FIG. 18 is a flowchart showing an example of a schematic flow of processing for generating objects by cutting according to an embodiment.

FIG. 18 is a flowchart showing an example of a schematic flow of processing for generating objects by cutting according to this embodiment.

First, the virtual space generation unit 143 cuts the object group into a plurality of cut object groups (S361).

The virtual space generation unit 143 selects one cut object group from among the plurality of cut object groups (S363), and copies the selected one cut object group (S365).

When all the plurality of cut object groups are selected (S367: YES), the processing ends; otherwise (S367: NO), the processing returns to the step S361.

4. Viewing of Three-Dimensional Virtual Space

Next, viewing of the three-dimensional virtual space according to this embodiment will be described with reference to FIG. 19 to FIG. 22.

4.1. Viewing from Position Inside Object

First, viewing from the inside of the object will be described with reference to FIG. 19 and FIG. 20.

(Virtual Space Generation Unit 143)

For example, the virtual space generation unit 143 generates the three-dimensional virtual space in a manner that, for each of the plurality of objects, one corresponding frame image is mapped on the curved inner surface. Specifically, a frame image is mapped on the inner surface of the cylindrical object 31 as shown in FIG. 6 to FIG. 8, for example.

(Image Generation Unit 145)

As described above, the image generation unit 145 generates an image of the three-dimensional virtual space seen from any position within the generated three-dimensional virtual space.

For example, the image generation unit 145 generates the image of the three-dimensional virtual space seen from a position inside the plurality of objects within the three-dimensional virtual space. A specific example on this point will be described below with reference to FIG. 19.

Figure 19:
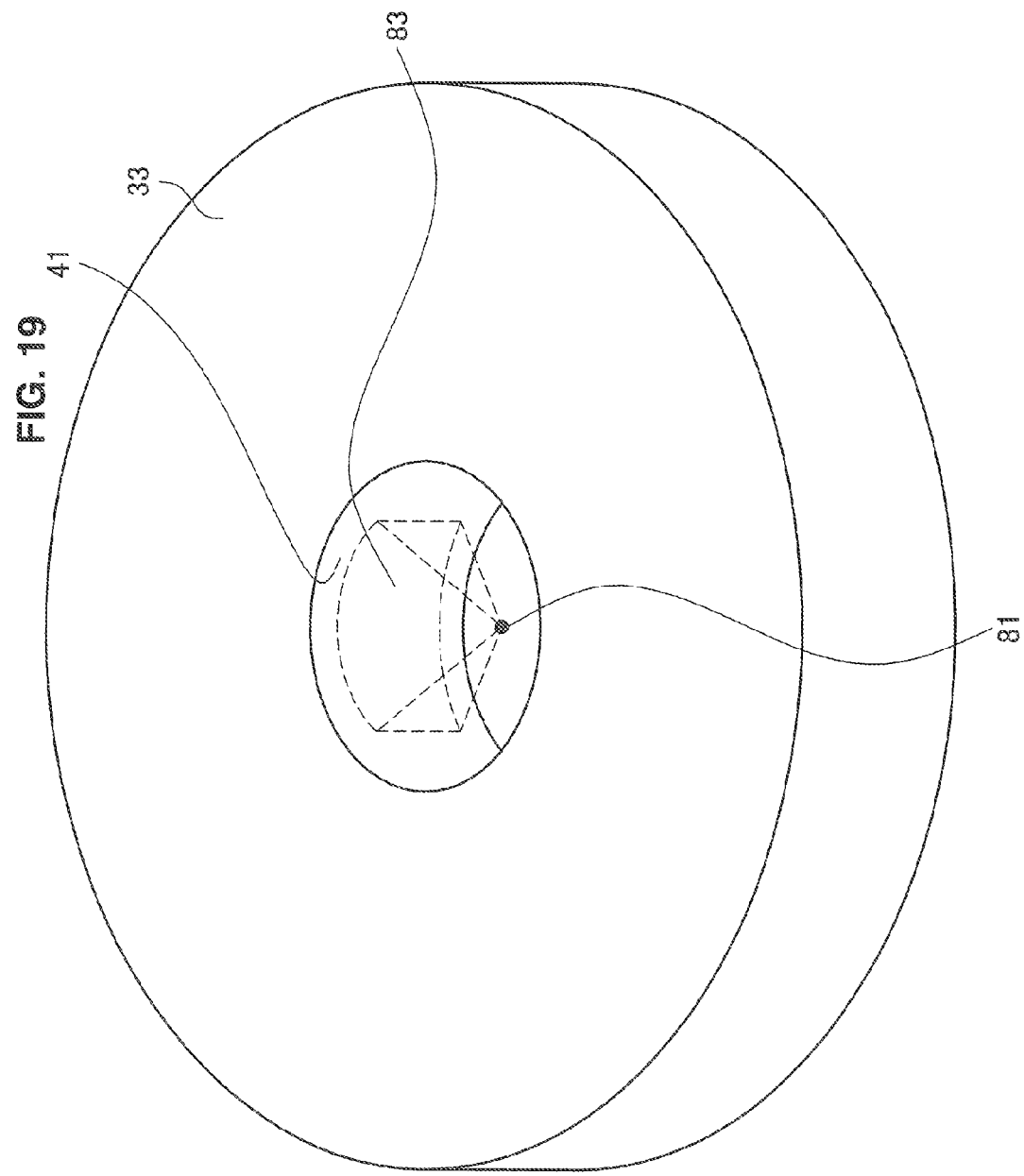
FIG. 19 shows an example of an image of a three-dimensional virtual space seen from a position inside an object group.

FIG. 19 shows an example of an image of the three-dimensional virtual space seen from a position inside the object group. Referring to FIG. 19, the object group 33 including the plurality of cylindrical objects is shown. For example, the image generation unit 145 generates an image of the three-dimensional virtual space seen from a position 81 inside the object group 33 by rendering. The position 81 is, for example, the center of the object group 33. Accordingly, an image in a range 83 in the inner surface 41 of the innermost cylindrical object of the object group 33 is generated. That is, the image in the range 83 in the inner surface 41 on which a frame image is mapped is generated.

Accordingly, for example, it becomes possible to view an image of a sight in a desired direction.

Further, for example, the image generation unit 145 sequentially deletes objects that are closer to the position among the plurality of objects (i.e., the position inside the plurality of objects), and generates the image of the three-dimensional virtual space every time an object is deleted.

Referring to FIG. 19 again, for example, the image generation unit 145 sequentially deletes cylindrical objects that are closer to the position 81 in the object group 33, and generates the image of the three-dimensional virtual space seen from the position 81 every time a cylindrical object is deleted.

Accordingly, for example, it becomes possible to view a moving image of a sight in a desired direction.

Further, for example, the image generation unit 145 downsizes, to the direction of the inner surface, every time an object is deleted, at least an object that is the closest to the position among remaining objects that are not deleted, and generates the image of the three-dimensional virtual space. For example, the object that is the closest to the position is downsized to have the same size as the deleted object.

Referring to FIG. 19 again, for example, the image generation unit 145 downsizes, every time the cylindrical object is deleted, the remaining cylindrical objects in the object group 33 to the direction of the inner surface. For example, the height of each of the remaining cylindrical objects is maintained; however, the internal diameter of each of the remaining cylindrical objects is downsized by one. In other words, when the first object from the inside is deleted, the (N+1)-th cylindrical object from the inside becomes the N-th cylindrical object from the inside, and the internal diameter of the cylindrical object is downsized from $I_{N+1}$ ($=I_1+N$) to $I_N$ ($=I_1+N-1$).

Accordingly, for example, it becomes possible to view the frame image mapped on the inner surface of the object with the same scaling because, even when the innermost object is sequentially deleted, the following object can be adjusted to have the same size. Accordingly, it becomes possible to view a normal moving image.

Note that, as described above, instead of downsizing the object every time the object is deleted, the three-dimensional virtual space including the object group 35 described with reference to FIG. 10 may be generated and used. As described above, in the object group 35, among the plurality of cylindrical objects, an object that is more distant from the center 47 of the object group 35 has a larger height than an object that is closer to the center 47.

Accordingly, for example, it becomes possible to view the frame image mapped on the inner surface of the object with the same scaling by only deleting the innermost object sequentially. Accordingly, it becomes possible to view a normal moving image.

(Display Control Unit 147)

For example, the display control unit 147 causes the display device 11 to display the image generated by the image generation unit 145.

More specifically, for example, when the image generation unit 145 generates the image of the three-dimensional virtual space seen from the position inside the plurality of objects within the three-dimensional virtual space, the display control unit 147 causes the display device 11 to display a screen including the generated image.

(Flow of Processing)

Figure 20:
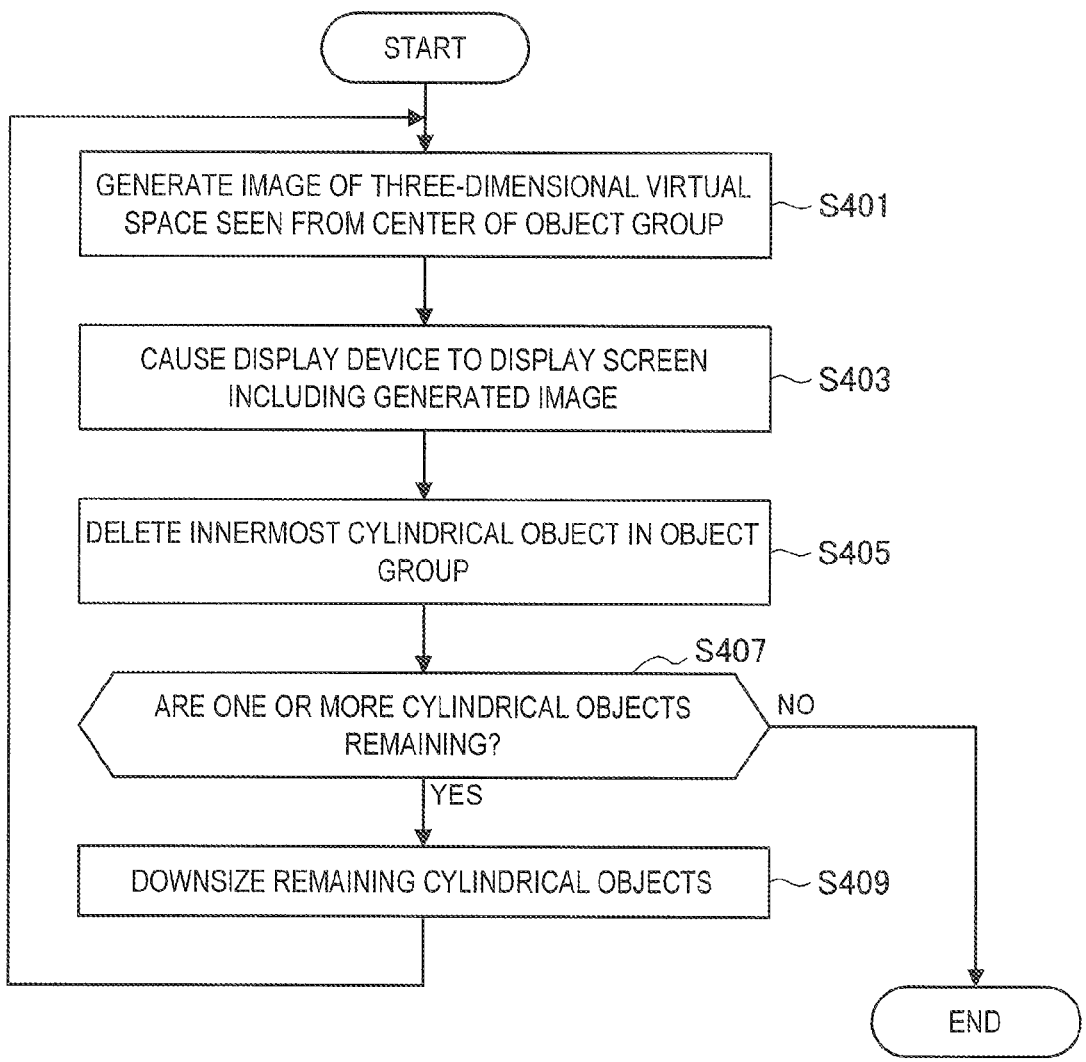
FIG. 20 is a flowchart showing an example of a schematic flow of processing for viewing from a position inside an object according to an embodiment.

FIG. 20 is a flowchart showing an example of a schematic flow of processing for viewing from the position inside the object according to this embodiment.

The image generation unit 145 generates the image of the three-dimensional virtual space seen from the center of the object group within the three-dimensional virtual space (S401). Then, the display control unit 147 causes the display device 11 to display a screen including the generated image (S403).

Next, the image generation unit 145 deletes the innermost cylindrical object in the object group (S405).

Then, when one or more cylindrical objects are remaining (S407: YES), the image generation unit 145 downsizes the remaining cylindrical objects to the direction of the inner surface (S409). Then, the processing returns to the step S401.

Meanwhile, when no cylindrical object remains (S407: NO), the processing ends.

4.2. Viewing from Given Position

Next, viewing from a given position will be described with reference to FIG. 21 and FIG. 22.

(Image Generation Unit 145)

As described above, the image generation unit 145 generates the image of the three-dimensional virtual space seen from any position within the generated three-dimensional virtual space.

For example, the image generation unit 145 generates the image of the three-dimensional virtual space seen from a given position within the three-dimensional virtual space.

As an example, the image generation unit 145 generates the image of the three-dimensional virtual space seen from a position right above the plurality of objects within the three-dimensional virtual space. A specific example on this point will be described below with reference to FIG. 21.

Figure 21:
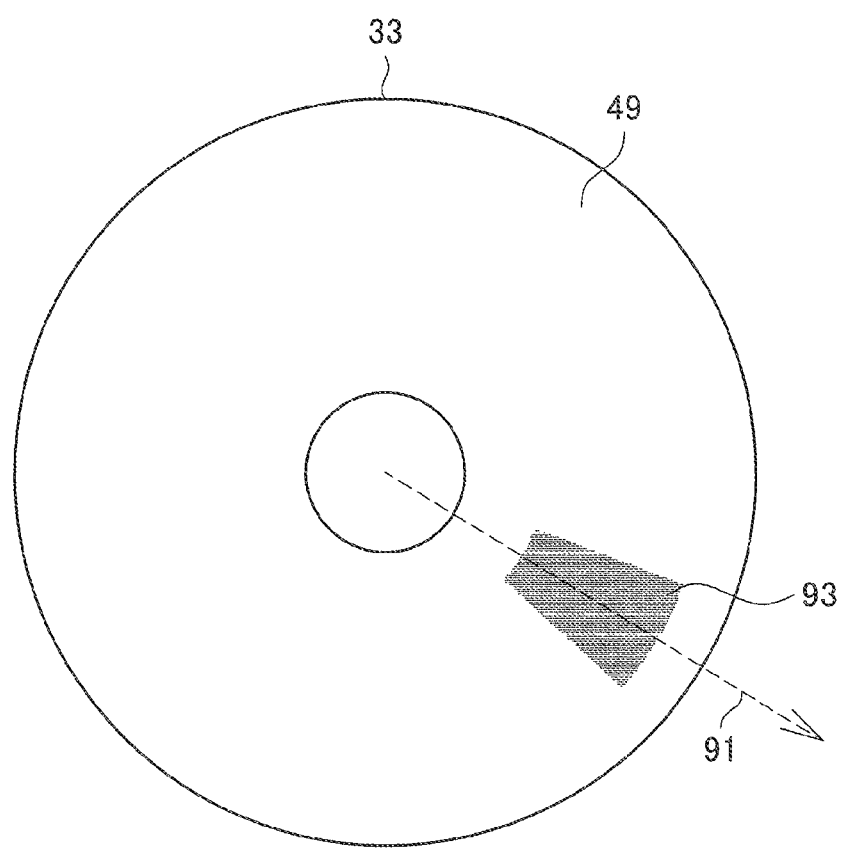
FIG. 21 shows an example of a three-dimensional virtual space seen from a position right above an object group.

FIG. 21 shows an example of the three-dimensional virtual space seen from a position right above the object group. Referring to FIG. 21, the three-dimensional virtual space seen from a position right above the object group 33 including the plurality of cylindrical objects is shown. For example, from the position right above the object group 33, a side surface 49 of the object group 33 is seen. The side surface 49 is formed by the side surface of the plurality of cylindrical objects. As described above, on the side surface of each of the cylindrical objects, the image generated on the basis of the frame image corresponding to the cylindrical object is mapped. Accordingly, when the frame image changes, the image mapped on the side surface also changes. For example, a part 93 on the side surface 49 has a different color or pattern from other parts in a direction 91 extending from the inside of the object group 33 to the outside thereof. Accordingly, it reveals that a certain change has occurred in a spatial range and temporal range corresponding to the part 93.

The viewpoint may be set at various positions without limitation to the position right above the object group. For example, the viewpoint can be set at an oblique position of the object group. Further, the viewpoint can be dynamically moved while the object group is seen. The viewpoint is set by a user's operation, for example. As an example, by user's clicking the position of the image of the three-dimensional virtual space, a position within the three-dimensional virtual space corresponding to the clicked position is set as the viewpoint.

In this manner, the image of the three-dimensional virtual space seen from a given position is generated.

Accordingly, for example, it becomes possible to intuitively recognize circumstances of a subject from various directions. As an example, it becomes possible to easily recognize the place of the subject. As another example, it becomes possible to easily recognize the direction of the subject.

Further, for example, as described above, it becomes possible to easily recognize a change in the moving image. Specifically, for example, it becomes possible to recognize the time when the change has occurred, from the image of the three-dimensional virtual space seen from the position right above the object group. Further, it becomes possible to recognize the range in the imaged range in which the change has occurred, from the image of the three-dimensional virtual space.

Furthermore, for example, it becomes possible to use the image of the three-dimensional virtual space as a thumbnail of the moving image. With such a thumbnail, the moving image can be looked down.

Note that, as described above in relation to the viewing from the position inside the object group, the innermost object included in the object group may be deleted and the remaining objects may be downsized, for example. Accordingly, it becomes possible to view the moving image from a freely set viewpoint (or a dynamically set viewpoint). Alternatively, it becomes possible to view the object group being downsized gradually in the three-dimensional virtual space.

Further, when imaging is performed in real time and the moving image is generated, an object group corresponding to the moving image may be generated in real time within the three-dimensional virtual space. Accordingly, it becomes possible to view the object group being enlarged gradually within the three-dimensional virtual space. Such generation is considered to be also displayed on a preview screen at the time of imaging in an apparatus such as a smartphone or a digital camera, for example. Note that, at the time of imaging in real time, in accordance with the inclination of the apparatus such as a smartphone or a digital camera (e.g., inclination detected by an acceleration sensor), the viewpoint within the three-dimensional virtual space may change.

(Flow of Processing)

Figure 22:
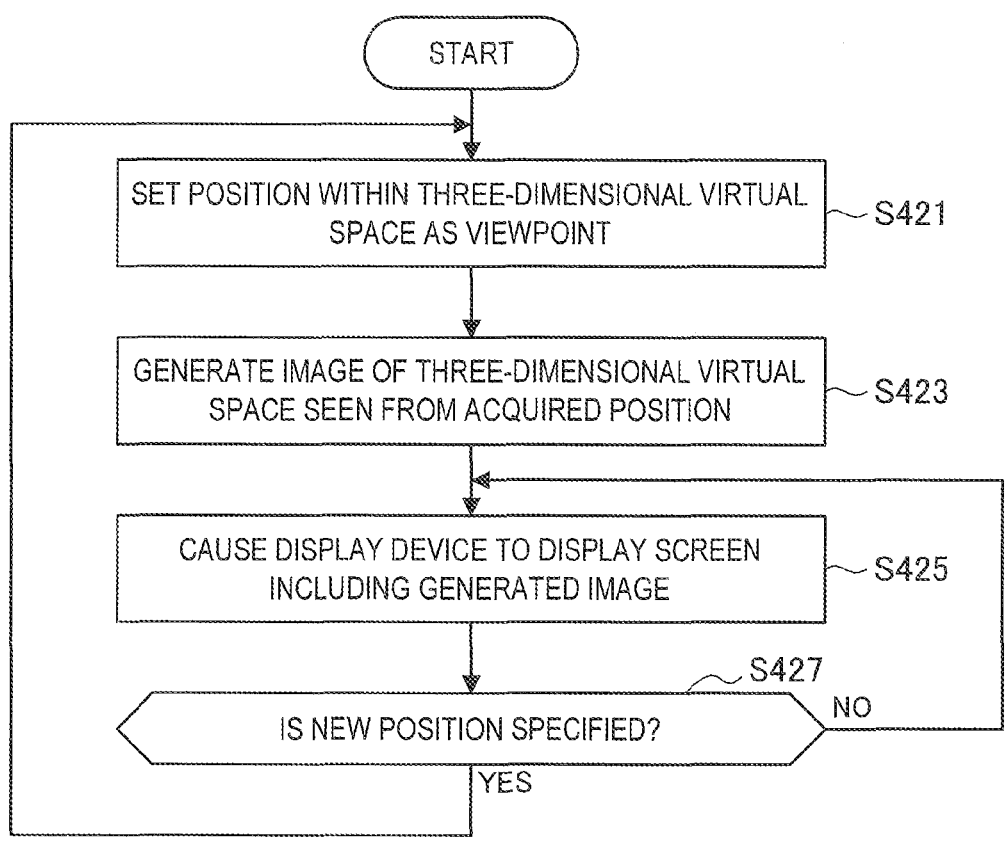
FIG. 22 is a flowchart showing an example of a schematic flow of processing for viewing from a given position according to an embodiment.

FIG. 22 is a flowchart showing an example of a schematic flow of processing for viewing from a given position according to this embodiment.

The image generation unit 145 sets a position within the three-dimensional virtual space as the viewpoint (S421). For example, in a case in which a user has specified a position, the position is set as the viewpoint. In a case in which the user has not specified the position, a default position is set as the viewpoint.

The image generation unit 145 generates an image of the three-dimensional virtual space seen from the acquired position (S423). Then, the display control unit 147 causes the display device 11 to display a screen including the generated image (S425).

In a case in which the user specifies a new position (S427), the processing returns to the step S421; otherwise, the processing returns to the step S425.

5. Modification Example

Next, modification examples according to this embodiment will be described with reference to FIG. 23 and FIG. 24.

5.1. First Modification Example

First, a first modification example of this embodiment will be described with reference to FIG. 23.

In this embodiment, for example, as described above, each of the plurality of objects included in the generated three-dimensional virtual space corresponds to one frame image among the plurality of frame images included in the moving image. That is, one object is generated for each frame image.

In contrast, in the first modification example, each of the plurality of objects included in the generated three-dimensional virtual space corresponds to two or more successive frame images among the plurality of frame images. That is, one object is generated for each two or more successive frames.

Accordingly, it becomes possible to reduce the number of objects within the three-dimensional virtual space. As a result, it becomes possible to reduce the processing amount and data amount expected for the generation, for example.

(Virtual Space Generation Unit 143)

As described above, the virtual space generation unit 143 generates a three-dimensional virtual space including one or more objects having a curved inner surface and a curved outer surface, on the basis of a plurality of frame images included in the moving image. Further, for example, the three-dimensional virtual space includes a plurality of objects having a curved inner surface and a curved outer surface.

Relation Between Plurality of Objects and Plurality of Frame Images

In particular, in the first modification example, each of the plurality of objects corresponds to two or more successive frame images among the plurality of frame images. That is, one object corresponds to two or more successive frame images, not one frame image. As a result, the number of objects is reduced.

Further, among the plurality of objects, an object that is closer to the position inside the plurality of objects corresponds to two or more successive earlier frame images among the plurality of frame images than an object that is more distant from the position.

As an example, one object corresponds to a certain number M of successive frame images, and in a case in which the plurality of frame images include F frame images, F/M objects are generated. Further, the N-th object from the inside corresponds to the M(N−1)+1-th frame image to the MN-th frame image.

Note that in the first modification example, each of the plurality of objects is the cylindrical object, for example. Further, for example, as described above, each of the plurality of objects corresponds to the certain number M of successive frame images. In this case, as a specific example, each of the plurality of objects has the height H and a thickness M. Further, the N-th cylindrical object from the inside of the plurality of objects has the internal diameter $I_N$ and the external diameter $O_N$. In the first modification example, the internal diameter $I_N$ and the external diameter $O_N$ can be expressed as follows, for example.

$I_N = I_1 + M(N-1)$ $O_N = I_N + M = I_1 + MN$

Mapping of Frame Image on Inner Surface/Outer Surface of Object

In particular, in the first modification example, the virtual space generation unit 143 generates the three-dimensional virtual space in a manner that, for each of the plurality of objects, a frame image included in the corresponding two or more successive frame images is mapped on at least one of the curved inner surface and the curved outer surface.

For example, for each of the plurality of objects, the first frame image among the corresponding two or more successive frame images is mapped on the inner surface, and the last frame among the corresponding two or more successive frame images is mapped on the outer surface.

More specifically, for example, on the inner surface of the N-th cylindrical object from the inside of the plurality of cylindrical objects, the M(N−1)+1-th frame image is mapped. Further, on the outer surface of the N-th cylindrical object from the inside of the plurality of cylindrical objects, the MN-th frame image is mapped.

Note that the frame image mapped on the inner surface and the outer surface of the cylindrical object is converted into a panorama image having a size that is suitable for the cylindrical object.

Mapping of Image on Side Surface of Object

In particular, in the first modification example, the virtual space generation unit 143 generates the three-dimensional virtual space in a manner that, for each of the plurality of objects, an image generated on the basis of the corresponding two or more successive frame images is mapped on the side surface.

For example, on the side surface of the N-th cylindrical object from the inside of the plurality of cylindrical objects, an image generated on the basis of the M(N−1)+1-th frame image to the MN-th frame image is mapped.

More specifically, for example, the side surface of the N-th cylindrical object has the thickness M, and is divided into M parts (ring-shaped parts) each having a thickness of 1, in the direction from the inside to the outside. Further, on an i-th part from the inside of the side surface, an image generated on the basis of the M(N−1)+i-th frame image is mapped. Such mapping generates the same side surface as the example in which one object is generated for each frame image.

(Flow of Processing)

Figure 23:
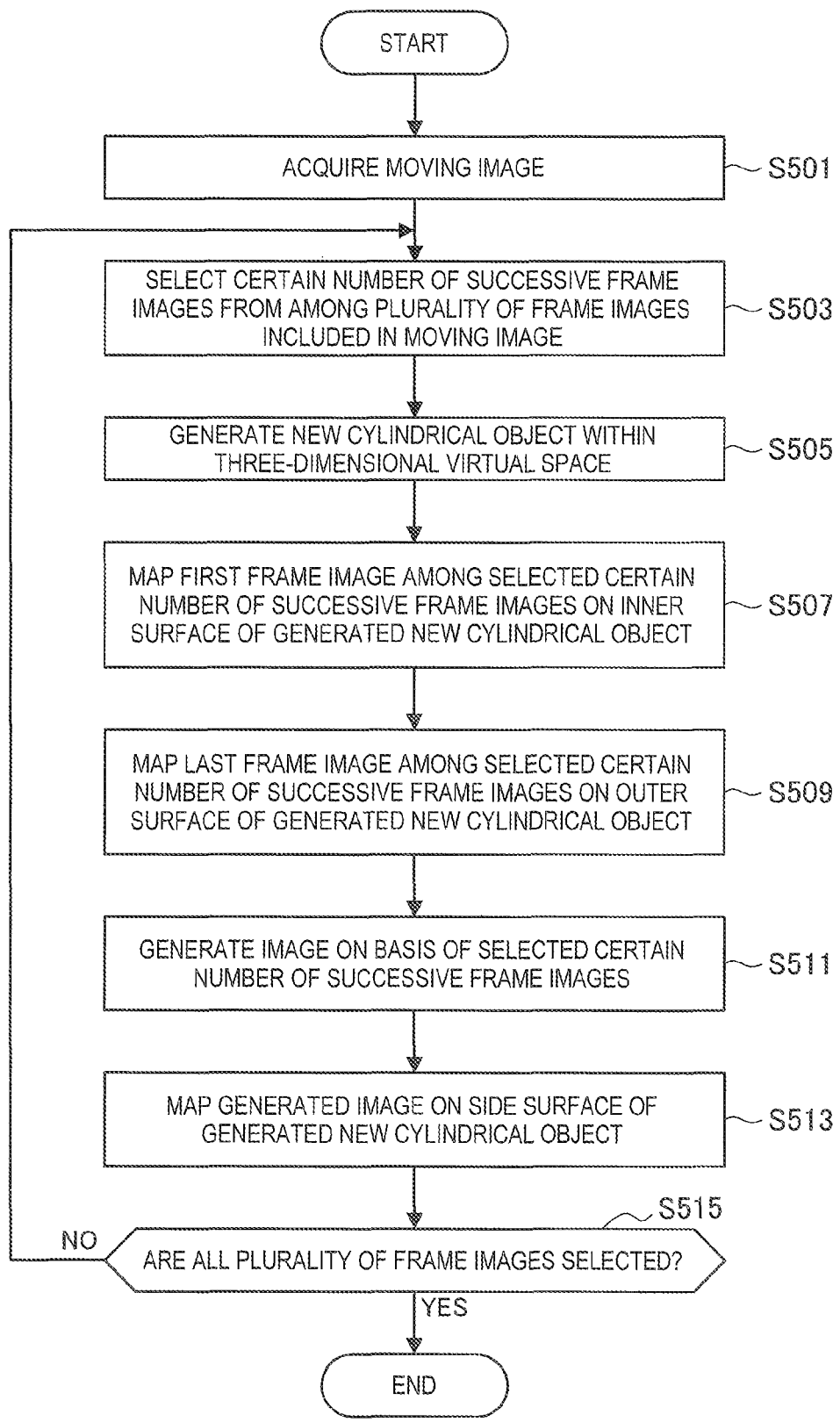
FIG. 23 is a flowchart showing an example of a schematic flow of processing for generating a three-dimensional virtual space according to a first modification example of an embodiment.

FIG. 23 is a flowchart showing an example of a schematic flow of processing for generating the three-dimensional virtual space according to the first modification example of this embodiment.

First, the moving image acquisition unit 141 acquires the moving image generated through imaging by the imaging apparatus having a view angle of 180° or more (S501).

The virtual space generation unit 143 selects a certain number of successive frame images from among the plurality of frame images included in the moving image (S503).

Further, the virtual space generation unit 143 generates a new cylindrical object within the three-dimensional virtual space (S505). Note that in a case in which one or more cylindrical objects have already been generated, the new cylindrical object is generated in a manner that the inner surface of the new cylindrical object is superposed on the outer surface of the outermost cylindrical object among the one or more cylindrical objects.

Next, the virtual space generation unit 143 maps the first frame image among the selected certain number of successive frame images on the inner surface of the generated new cylindrical object (S507). Further, the virtual space generation unit 143 maps the last frame image among the selected certain number of successive frame images on the outer surface of the generated new cylindrical object (S509).

Further, the virtual space generation unit 143 generates an image on the basis of the selected certain number of successive frame images (S511). Then, the virtual space generation unit 143 maps the generated image on the side surface of the generated new cylindrical object (S513).

Then, when all the plurality of frame images included in the moving image are selected (S515: YES), the processing ends; otherwise (S515: NO), the processing returns to the step S503.

5.2. Second Modification Example

Next, a second modification example of this embodiment will be described with reference to FIG. 24.

In this embodiment, for example, as described above, the generated three-dimensional virtual space includes a plurality of objects. That is, one object is generated for each frame image.

In contrast, in the second modification example, the generated three-dimensional virtual space includes one object. That is, one object is generated with respect to the plurality of frame images included in the moving image.

Accordingly, it becomes possible to reduce the number of objects within the three-dimensional virtual space. As a result, it becomes possible to reduce the processing amount and data amount expected for the generation, for example.

(Virtual Space Generation Unit 143)

As described above, the virtual space generation unit 143 generates a three-dimensional virtual space including one or more objects having a curved inner surface and a curved outer surface, on the basis of a plurality of frame images included in the moving image.

In particular, in the second modification example, the three-dimensional virtual space includes one object having the curved inner surface and the curved outer surface. That is, the virtual space generation unit 143 generates the three-dimensional virtual space including the one object having the curved inner surface and the curved outer surface on the basis of the plurality of frame images.

Note that, also in the second modification example, the one object is the cylindrical object, for example. As an example, in a case in which the plurality of frame images include F frame images, the one object has the height H and a thickness F. Further, the one object has an internal diameter I and an external diameter O. In the second modification example, the external diameter O can be expressed as follows, for example.

$$O = I + F$$

Mapping of Frame Image on Inner Surface/Outer Surface of Object

In particular, in the second modification example, the virtual space generation unit 143 generates the three-dimensional virtual space in a manner that, for the one object, a frame image included in the plurality of frame images is mapped on at least one of the curved inner surface and the curved outer surface.

For example, for the one object, the first frame image among the plurality of frame images included in the moving image is mapped on the inner surface, and the last frame image among the plurality of frame images is mapped on the outer surface.

Note that the frame image mapped on the inner surface and the outer surface of the cylindrical object is converted into a panorama image having a size that is suitable for the cylindrical object.

Mapping of Image on Side Surface of Object

In particular, in the second modification example, the virtual space generation unit 143 generates the three-dimensional virtual space in a manner that, for the one object, an image generated on the basis of the plurality of frame images is mapped on the side surface.

For example, the side surface of the one object has the thickness F, and is divided into F parts (ring-shaped parts) each having a thickness of 1, in the direction from the inside to the outside. Further, on an i-th part from the inside of the side surface, an image generated on the basis of the i-th frame image is mapped. Such mapping generates the same side surface as the example in which one object is generated for each frame image.

(Flow of Processing)

FIG. 24 is a flowchart showing an example of a schematic flow of processing for generating the three-dimensional virtual space according to the second modification example of this embodiment.

First, the moving image acquisition unit 141 acquires the moving image generated through imaging by the imaging apparatus having a view angle of 180° or more (S521).

Further, the virtual space generation unit 143 generates a new cylindrical object within the three-dimensional virtual space (S523).

Next, the virtual space generation unit 143 maps the first frame image among the plurality of frame images included in the moving image on the inner surface of the generated new cylindrical object (S525). Further, the virtual space generation unit 143 maps the last frame image among the plurality of frame images included in the moving image on the outer surface of the generated new cylindrical object (S527).

Further, the virtual space generation unit 143 generates an image on the basis of the plurality of frame images included in the moving image (S529). Then, the virtual space generation unit 143 maps the generated image on the side surface of the generated new cylindrical object (S531). The processing ends.

6. Conclusion

The information processing apparatus and processing according to an embodiment of the present disclosure have been described above with reference to FIG. 1 to FIG. 24. According to an embodiment of the present disclosure, the moving image acquisition unit 141 acquires a moving image generated through imaging by an imaging apparatus having a view angle of 180° or more. The virtual space generation unit 143 generates a three-dimensional virtual space including one or more objects having a curved inner surface and a curved outer surface, on the basis of a plurality of frame images included in the moving image. Further, the virtual space generation unit 143 generates the three-dimensional virtual space in a manner that, for each of the one or more objects, a frame image included in the plurality of frame images is mapped on at least one of the curved inner surface and the curved outer surface. Accordingly, it becomes possible to intuitively recognize circumstances of a subject from the moving image generated through the imaging apparatus having a wide view angle. More specifically, for example, it becomes possible to intuitively recognize circumstances of a subject more by setting a viewpoint within the three-dimensional virtual space and seeing the inner surface or the outer surface of the object from the viewpoint. As an example, it becomes possible to easily recognize the place of the subject. As another example, it becomes possible to easily recognize the direction of the subject.

Generation of Three-Dimensional Virtual Space Including Plurality of Objects

Further, for example, the three-dimensional virtual space includes a plurality of objects having a curved inner surface and a curved outer surface. The plurality of objects are laminated in a manner that the inner surface of one of two adjacent objects is superposed on the outer surface of the other. Each of the plurality of objects corresponds to a frame image included in the plurality of frame images. Among the plurality of objects, an object that is closer to a position inside the plurality of objects corresponds to an earlier frame image among the plurality of frame images than an object that is more distant from the position. The virtual space generation unit 143 generates the three-dimensional virtual space in a manner that, for each of the plurality of objects, a corresponding frame image is mapped on at least one of the curved inner surface and the curved outer surface. Accordingly, it becomes possible to view a moving image of a sight in a desired direction, for example.

Further, for example, each of the plurality of objects further includes a side surface. Furthermore, the virtual space generation unit 143 generates the three-dimensional virtual space in a manner that, for each of the plurality of objects, an image generated on the basis of the corresponding frame image is mapped on the side surface. Thus, it becomes possible to easily recognize a change in the time direction in the moving image generated through the imaging apparatus having a wide view angle, from the side surface of the plurality of objects included in the three-dimensional virtual space, for example. For example, in a case in which the imaging apparatus having a wide view angle (e.g., a view angle of 360°) is installed at a certain position and generates the moving image by imaging, it becomes possible to easily recognize a change in the moving image. As an example, it becomes possible to easily recognize movement of a person in the moving image (e.g., passage or entrance and exit of a person). As another example, it becomes possible to easily recognize a change in environment in the moving image (e.g., switching off of light, change of weather, or end of a presentation).

Further, for example, each pixel of the image mapped on the side surface is a pixel generated on the basis of a group of pixels aligned in a certain direction in the corresponding frame image. Thus, for example, it becomes possible to make an image of each part of the side surface of the object correspond to the image mapped on a corresponding part in the inner surface or the outer surface. Accordingly, it becomes possible to easily recognize the range where the change occurs in a wide imaged range.

Object Corresponding to One Frame Image

Further, for example, each of the plurality of objects corresponds to any one of the plurality of frame images. Among the plurality of objects, an object that is closer to a position inside the plurality of objects corresponds to one earlier frame image among the plurality of frame images than an object that is more distant from the position. The virtual space generation unit 143 generates the three-dimensional virtual space in a manner that, for each of the plurality of objects, one corresponding frame image is mapped on at least one of the curved inner surface and the curved outer surface and an image generated on the basis of the one corresponding frame image is mapped on the side surface.

Thus, it becomes possible to view a moving image of a sight in a desired direction at an original frame rate, for example.

Object Corresponding to Two or More Successive Frame Images

Further, for example, according to the first modification example, each of the plurality of objects corresponds to two or more successive frame images among the plurality of frame images. Among the plurality of objects, an object that is closer to the position inside the plurality of objects corresponds to two or more successive earlier frame images among the plurality of frame images than an object that is more distant from the position. The virtual space generation unit 143 generates the three-dimensional virtual space in a manner that, for each of the plurality of objects, a frame image included in the corresponding two or more successive frame images is mapped on at least one of the curved inner surface and the curved outer surface and an image generated on the basis of the corresponding two or more successive frame images is mapped on the side surface. Accordingly, it becomes possible to reduce the number of objects within the three-dimensional virtual space. As a result, it becomes possible to reduce the processing amount and data amount expected for the generation, for example.

Generation of Subsets of Plurality of Objects

Further, for example, the virtual space generation unit 143 generates subsets of the plurality of objects.

As a first example, the subset is a set of one or more objects each corresponding to at least one of one or more frame images that satisfy specified conditions among the plurality of frame images. Accordingly, for example, it becomes possible to intuitively recognize circumstances of a subject in a part of the moving image where the specified conditions are satisfied. Further, for example, it becomes possible to view the part of the moving image where the specified conditions are satisfied by use of the three-dimensional virtual space.

As a second example, the subset is a set of one or more objects each corresponding to at least one of one or more frame images within one scene among the plurality of frame images. Thus, for example, it becomes possible to intuitively recognize circumstances of a subject within a specific scene in a moving image. Further, for example, it becomes possible to view the specific scene in the moving image by use of the three-dimensional virtual space.

Viewing of Object from Position Inside

Further, for example, the virtual space generation unit 143 generates the three-dimensional virtual space in a manner that, for each of the plurality of objects, one corresponding frame image is mapped on the curved inner surface. The image generation unit 145 generates an image of the three-dimensional virtual space seen from a position inside the plurality of objects within the three-dimensional virtual space. Accordingly, for example, it becomes possible to view an image of a sight in a desired direction.

Further, for example, the image generation unit 145 sequentially deletes objects that are closer to the position among the plurality of objects, and generates the image of the three-dimensional virtual space every time an object is deleted. Accordingly, for example, it becomes possible to view a moving image of a sight in a desired direction.

Further, for example, the image generation unit 145 downsizes, to the direction of the inner surface, every time an object is deleted, at least an object that is the closest to the position among remaining objects that are not deleted, and generates the image of the three-dimensional virtual space. Accordingly, for example, it becomes possible to view the frame image mapped on the inner surface of the object with the same scaling because, even when the innermost object is sequentially deleted, the following object can be adjusted to have the same size. Accordingly, it becomes possible to view a normal moving image.

Further, for example, each of the plurality of objects is a cylindrical object. Among the plurality of objects, an object that is more distant from the position has a larger height than an object that is closer to the position. Accordingly, for example, it becomes possible to view the frame image mapped on the inner surface of the object with the same scaling by only deleting the innermost object sequentially. Accordingly, it becomes possible to view a normal moving image.

Generation of Three-Dimensional Virtual Space Including One Object

Further, for example, according to the second modification example, the three-dimensional virtual space includes one object having a curved inner surface and a curved outer surface. The one object further includes a side surface. The virtual space generation unit 143 generates the three-dimensional virtual space in a manner that, for the one object, a frame image included in the plurality of frame images is mapped on at least one of the curved inner surface and the curved outer surface and an image generated on the basis of the plurality of frame images is mapped on the side surface. Accordingly, it becomes possible to reduce the number of objects within the three-dimensional virtual space. As a result, it becomes possible to reduce the processing amount and data amount expected for the generation, for example.

Generation of Object by Cutting

Further, for example, the virtual space generation unit 143 generates one or more cut objects by cutting the one or more objects along one or more planes. Accordingly, for example, it becomes possible to intuitively recognize circumstances of a subject within a limited range in an imaged range. Further, for example, it becomes possible to view the limited range in the imaged range by use of a three-dimensional virtual space.

Furthermore, for example, the virtual space generation unit 143 generates the one or more cut objects in a manner that an image generated on the basis of the plurality of frame images is mapped on the cut plane of the one or more cut objects generated by the cutting. Accordingly, for example, it becomes possible to easily recognize a change in the time direction in the moving image at various cut sections generated by the cutting.

Viewing from Given Position

Further, for example, the image generation unit 145 generates an image of the three-dimensional virtual space seen from a given position within the three-dimensional virtual space. Accordingly, for example, it becomes possible to intuitively recognize circumstances of a subject from various directions. As an example, it becomes possible to easily recognize the place of the subject. As another example, it becomes possible to easily recognize the direction of the subject.

Further, for example, it becomes possible to easily recognize a change in the moving image. Specifically, for example, it becomes possible to recognize the time when the change has occurred, from an image of the three-dimensional virtual space seen from a position right above an object group. Further, it becomes possible to recognize the range in the imaged range in which the change has occurred, from the image of the three-dimensional virtual space.

Furthermore, for example, it becomes possible to use the image of the three-dimensional virtual space as a thumbnail of the moving image. With such a thumbnail, the moving image can be looked down.

Others

According to this embodiment, for example, one model can be used for a thumbnail and for viewing. Accordingly, the implementation of the generation of a thumbnail image and the generation of an image for viewing may be common. Further, a user can see the same thing in the thumbnail image and the image for viewing.

Further, for example, it becomes possible to perform viewing of the three-dimensional virtual space and editing of the three-dimensional virtual space (search by conditions, scene division, cutting, and the like) by use of an identical metaphor. For example, it is possible to perform various viewing methods and various editing methods with seamless intervals therebetween. Further, for example, even when object groups are generated for various moving images, it is possible to integrate the object groups easily. Furthermore, it is possible to cut out a moving image in a desired temporal range and/or a desired spatial range from an object group for one moving image. Such integration or cutting out makes it possible to obtain the object group of the moving image in the desired range and to view the moving image in the desired range.

Although the preferred embodiments of the present disclosure have been described in detail with reference to the appended drawings, the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, although the example in which the object included in the generated three-dimensional virtual space is the cylindrical object has been mainly shown above, the present disclosure is not limited to this example. For example, the object included in the generated three-dimensional virtual space may be an object that is a part of a spherical shell. As an example, the object included in the generated three-dimensional virtual space may be a semispherical shell object. With such a semispherical shell object, for example, it becomes possible to map a dome type image easily, instead of a panorama image. Further, for example, the object included in the three-dimensional virtual space may be a spherical shell object. With such a spherical shell object, it becomes possible to map a whole-sky image easily, instead of a panorama image. The object that is a part of a spherical shell (e.g., a semispherical shell object) and a spherical shell object may be subjected to the above described processing in the same manner as the cylindrical object. However, note that the spherical shell object does not include a side surface.

Furthermore, although the example in which the information processing apparatus is a personal computer has been described above, the present disclosure is not limited to this example. For example, the information processing apparatus may be another apparatus such as a smart phone, a tablet terminal, a mobile information terminal (a personal digital assistant), an e-book terminal, a car navigation system, or a game machine.

Furthermore, although the example in which the input device for the information processing apparatus is a mouse has been described above, the present disclosure is not limited to this example. For example, the input device may be another device such as a touchscreen, a keyboard, or a button. Further, instead of the input device, a camera for gesture recognition, a microphone for voice recognition, or the like may be used.

Also, the processing steps in information processing in this specification are not strictly limited to being executed in a time series following the sequence described in a flowchart. For example, the processing steps in information processing may be executed in a sequence that differs from a sequence described herein as a flowchart, and furthermore may be executed in parallel.

In addition, it is possible to create a computer program for causing hardware such as a CPU, ROM, and RAM built into an information processing apparatus to exhibit functions similar to each structural element of the information processing apparatus. Also, a storage medium having such a computer program stored therein may also be provided. Also, an information processing apparatus (for example, a processing circuit or chip) equipped with memory storing such a computer program (for example, ROM and RAM) and one or more processors capable of executing such a computer program (such as a CPU or DSP, for example) may also be provided.

The effects described in the specification are just explanatory or exemplary effects, and are not limiting. That is, the technology according to the present disclosure can exhibit other effects that are apparent to a person skilled in the art from the descriptions in the specification, along with the above effects or instead of the above effects.

Additionally, the present technology may also be configured as below.

(1)
An information processing apparatus including:
an acquisition unit configured to acquire a moving image generated through imaging by an imaging apparatus having a view angle of 180° or more; and
a virtual space generation unit configured to generate a three-dimensional virtual space including one or more objects having a curved inner surface and a curved outer surface, on the basis of a plurality of frame images included in the moving image,
wherein the virtual space generation unit generates the three-dimensional virtual space in a manner that, for each of the one or more objects, a frame image included in the plurality of frame images is mapped on at least one of the curved inner surface and the curved outer surface.

(2)
The information processing apparatus according to (1),
wherein the three-dimensional virtual space includes a plurality of objects each having a curved inner surface and a curved outer surface,
wherein the plurality of objects are laminated in a manner that the inner surface of one of two adjacent objects is superposed on the outer surface of the other,
wherein the plurality of objects each correspond to a frame image included in the plurality of frame images,
wherein, among the plurality of objects, an object that is closer to a position inside the plurality of objects corresponds to an earlier frame image among the plurality of frame images than an object that is more distant from the position, and
wherein the virtual space generation unit generates the three-dimensional virtual space in a manner that, for each of the plurality of objects, a corresponding frame image is mapped on at least one of the curved inner surface and the curved outer surface.

(3)
The information processing apparatus according to (2),
wherein the plurality of objects each further include a side surface.

(4)
The information processing apparatus according to (3),
wherein the virtual space generation unit generates the three-dimensional virtual space in a manner that, for each of the plurality of objects, an image generated on the basis of the corresponding frame image is mapped on the side surface.

(5)
The information processing apparatus according to (4),
wherein the image mapped on the side surface includes pixels each of which is generated on the basis of a group of pixels aligned in a certain direction in the corresponding frame image.

(6)
The information processing apparatus according to (4) or (5),
wherein the plurality of objects each correspond to any one of the plurality of frame images,
wherein, among the plurality of objects, an object that is closer to the position inside the plurality of objects corresponds to one earlier frame image among the plurality of frame images than an object that is more distant from the position, and
wherein the virtual space generation unit generates the three-dimensional virtual space in a manner that, for each of the plurality of objects, one corresponding frame image is mapped on at least one of the curved inner surface and the curved outer surface and an image generated on the basis of the one corresponding frame image is mapped on the side surface.

(7)
The information processing apparatus according to (4) or (5),
wherein the plurality of objects each correspond to two or more successive frame images among the plurality of frame images,
wherein, among the plurality of objects, an object that is closer to the position inside the plurality of objects corresponds to two or more successive earlier frame images among the plurality of frame images than an object that is more distant from the position, and
wherein the virtual space generation unit generates the three-dimensional virtual space in a manner that, for each of the plurality of objects, a frame image included in the corresponding two or more successive frame images is mapped on at least one of the curved inner surface and the curved outer surface and an image generated on the basis of the corresponding two or more successive frame images is mapped on the side surface.

(8)
The information processing apparatus according to any one of (2) to (7),
wherein the virtual space generation unit generates a subset of the plurality of objects.

(9)
The information processing apparatus according to (8),
wherein the subset is a set of one or more objects each corresponding to at least one of one or more frame images that satisfy specified conditions among the plurality of frame images.

(10)
The information processing apparatus according to (8),
wherein the subset is a set of one or more objects each corresponding to at least one of one or more frame images within one scene among the plurality of frame images.

(11)
The information processing apparatus according to any one of (2) to (10),
wherein the virtual space generation unit generates the three-dimensional virtual space in a manner that, for each of the plurality of objects, one corresponding frame image is mapped on the curved inner surface, and
wherein the information processing apparatus further includes an image generation unit configured to generate an image of the three-dimensional virtual space seen from the position inside the plurality of objects within the three-dimensional virtual space.

(12)
The information processing apparatus according to (11),
wherein the image generation unit sequentially deletes objects that are closer to the position among the plurality of objects, and generates the image of the three-dimensional virtual space every time an object is deleted.

(13)
The information processing apparatus according to (12),
wherein the image generation unit downsizes, to a direction of the inner surface, every time an object is deleted, at least an object that is the closest to the position among remaining objects that are not deleted, and generates the image of the three-dimensional virtual space.

(14)
The information processing apparatus according to (12),
wherein the plurality of objects are each a cylindrical object, and
wherein, among the plurality of objects, an object that is more distant from the position has a larger height than an object that is closer to the position.

(15)
The information processing apparatus according to (1),
wherein the three-dimensional virtual space includes one object having a curved inner surface and a curved outer surface,
wherein the one object further includes a side surface, and
wherein the virtual space generation unit generates the three-dimensional virtual space in a manner that, for the one object, a frame image included in the plurality of frame images is mapped on at least one of the curved inner surface and the curved outer surface and an image generated on the basis of the plurality of frame images is mapped on the side surface.

(16)
The information processing apparatus according to any one of (1) to (15),
wherein the virtual space generation unit generates one or more cut objects by cutting the one or more objects along one or more planes.

(17)
The information processing apparatus according to (16),
wherein the virtual space generation unit generates the one or more cut objects in a manner that an image generated on the basis of the plurality of frame images is mapped on a cut surface of the one or more cut objects obtained by the cutting.

(18)
The information processing apparatus according to any one of (1) to (17), further including:
an image generation unit configured to generate an image of the three-dimensional virtual space seen from a given position within the three-dimensional virtual space.

(19)
An information processing method including:
acquiring a moving image generated through imaging by an imaging apparatus having a view angle of 180° or more; and
generating, by a processor, a three-dimensional virtual space including one or more objects having a curved inner surface and a curved outer surface, on the basis of a plurality of frame images included in the moving image,
wherein the generating the three-dimensional virtual space includes generating the three-dimensional virtual space in a manner that, for each of the one or more objects, a frame image included in the plurality of frame images is mapped on at least one of the curved inner surface and the curved outer surface.

(20)
A program for causing a computer to execute:
acquiring a moving image generated through imaging by an imaging apparatus having a view angle of 180° or more; and
generating a three-dimensional virtual space including one or more objects having a curved inner surface and a curved outer surface, on the basis of a plurality of frame images included in the moving image,
wherein the generating the three-dimensional virtual space includes generating the three-dimensional virtual space in a manner that, for each of the one or more objects, a frame image included in the plurality of frame images is mapped on at least one of the curved inner surface and the curved outer surface.

What is claimed is:
1. An information processing apparatus comprising:
one or more processors configured to:
acquire a moving image generated through imaging by an imaging apparatus having a view angle of 180° or more; and
generate a three-dimensional virtual space including a plurality of objects each having a curved inner surface and a curved outer surface, on the basis of a plurality of frame images included in the moving image,
wherein the one or more processors are configured to generate the three-dimensional virtual space in a manner that, for each of the plurality of objects, a frame image included in the plurality of frame images is mapped on at least one of the curved inner surface and the curved outer surface,
wherein the plurality of objects are laminated in a manner that the curved inner surface of an outer object of one of two adjacent objects is superposed on the curved outer surface of an inner object of the one of two adjacent objects.

2. The information processing apparatus according to claim 1,
wherein, among the plurality of objects, an object that is closer to a position inside the plurality of objects corresponds to an earlier frame image among the plurality of frame images than an object that is more distant from the position.

3. The information processing apparatus according to claim 1, wherein the plurality of objects each further include a side surface.

4. The information processing apparatus according to claim 3,
wherein the one or more processors are configured to generate the three-dimensional virtual space in a manner that, for each of the plurality of objects, an image generated on the basis of the corresponding frame image is mapped on the side surface.

5. The information processing apparatus according to claim 4,
wherein the image mapped on the side surface includes pixels each of which is generated on the basis of a group of pixels aligned in a certain direction in the corresponding frame image.

6. The information processing apparatus according to claim 4,
wherein, among the plurality of objects, an object that is closer to the position inside the plurality of objects corresponds to one earlier frame image among the plurality of frame images than an object that is more distant from the position, and
wherein the one or more processors are configured to generate the three-dimensional virtual space in a manner that, for each of the plurality of objects, one corresponding frame image is mapped on at least one of the curved inner surface and the curved outer surface and an image generated on the basis of the one corresponding frame image is mapped on the side surface.

7. The information processing apparatus according to claim 4,
wherein the plurality of objects each correspond to two or more successive frame images among the plurality of frame images,
wherein, among the plurality of objects, an object that is closer to the position inside the plurality of objects corresponds to two or more successive earlier frame images among the plurality of frame images than an object that is more distant from the position, and
wherein the one or more processors are configured to generate the three-dimensional virtual space in a manner that, for each of the plurality of objects, a frame image included in the corresponding two or more successive frame images is mapped on at least one of the curved inner surface and the curved outer surface, and an image generated on the basis of the corresponding two or more successive frame images is mapped on the side surface.

8. The information processing apparatus according to claim 1,
wherein the one or more processors are configured to generate a subset of the plurality of objects.

9. The information processing apparatus according to claim 8,
wherein the subset is a set of one or more objects each corresponding to
at least one of one or more frame images that satisfy specified conditions among
the plurality of frame images.

10. The information processing apparatus according to claim 8,
wherein the subset is a set of one or more objects each corresponding to at least one of one or more frame images within one scene among the plurality of frame images.

11. The information processing apparatus according to claim 1,
wherein the one or more processors are configured to generate the three-dimensional virtual space in a manner that, for each of the plurality of objects, one corresponding frame image is mapped on the curved inner surface, and
wherein the one or more processors are configured to generate an image of the three-dimensional virtual space seen from the position inside the plurality of objects within the three-dimensional virtual space.

12. The information processing apparatus according to claim 11,
wherein the one or more processors are configured to sequentially delete objects that are closer to the position among the plurality of objects, and generate the image of the three-dimensional virtual space every time an object is deleted.

13. The information processing apparatus according to claim 12,
wherein the one or more processors are configured to downsize, to a direction of the inner surface, every time an object is deleted, at least an object that is the closest to the position among remaining objects that are not deleted, and generate the image of the three-dimensional virtual space.

14. The information processing apparatus according to claim 12,
wherein the plurality of objects are each a cylindrical object, and
wherein, among the plurality of objects, an object that is more distant from the position has a larger height than an object that is closer to the position.

15. The information processing apparatus according to claim 1,
wherein the three-dimensional virtual space
further includes one object having a side surface, and
wherein the one or more processors are
configured to generate the three-dimensional virtual space in a manner that,
for the one object, an image generated on the basis of the plurality of frame images is mapped on the side surface.

16. The information processing apparatus according to claim 1,
wherein the one or more processors are configured to generate one or more cut objects by cutting the plurality of objects along one or more planes.

17. The information processing apparatus according to claim 16,
wherein the one or more processors are configured to generate the one or more cut objects in a manner that an image generated on the basis of the plurality of frame images is mapped on a cut surface of the one or more cut objects obtained by the cutting.

18. The information processing apparatus according to claim 1,
wherein the one or more processors are
configured to generate an image of the three-dimensional virtual space seen from a given position within the three-dimensional virtual space.

19. An information processing method comprising:
acquiring a moving image generated through imaging by an imaging apparatus having a view angle of 180° or more; and
generating, by a processor, a three-dimensional virtual space including a plurality of objects each having a curved inner surface and a curved outer surface, on the basis of a plurality of frame images included in the moving image, wherein the generating the three-dimensional virtual space includes generating the three-dimensional virtual space in a manner that, for each of the plurality of objects, a frame image included in the plurality of frame images is mapped on at least one of the curved inner surface and the curved outer surface, wherein the plurality of objects are laminated in a manner that the curved inner surface of an outer object of one of two adjacent objects is superposed on the curved outer surface of an inner object of the one of two adjacent objects.

20. A non-transitory computer readable medium having stored thereon, a set of computer-executable instructions for causing a computer to perform steps comprising:

acquiring a moving image generated through imaging by an imaging apparatus having a view angle of 180° or more; and generating a three-dimensional virtual space including a plurality of objects each having a curved inner surface and a curved outer surface, on the basis of a plurality of frame images included in the moving image, wherein the generating the three-dimensional virtual space includes generating the three-dimensional virtual space in a manner that, for each of the plurality of objects, a frame image included in the plurality of frame images is mapped on at least one of the curved inner surface and the curved outer surface, wherein the plurality of objects are laminated in a manner that the curved inner surface of an outer object of one of two adjacent objects is superposed on the curved outer surface of an inner object of the one of the two adjacent objects.

* * * * *